(12) United States Patent
Ueshima

(10) Patent No.: US 8,272,954 B2
(45) Date of Patent: Sep. 25, 2012

(54) FOOT INPUT TYPE BRAIN TRAINING DEVICE AND COMPUTER PROGRAM

(75) Inventor: Hiromu Ueshima, Shiga (JP)

(73) Assignee: SSD Company Limited, Shiga (JP)

( * ) Notice: Subject to any disclaimer, the term of this patent is extended or adjusted under 35 U.S.C. 154(b) by 0 days.

(21) Appl. No.: 12/666,669

(22) PCT Filed: Jul. 3, 2008

(86) PCT No.: PCT/JP2008/001762
§ 371 (c)(1),
(2), (4) Date: Oct. 5, 2010

(87) PCT Pub. No.: WO2009/004816
PCT Pub. Date: Jan. 8, 2009

(65) Prior Publication Data
US 2011/0014979 A1    Jan. 20, 2011

(30) Foreign Application Priority Data
Jul. 3, 2007   (JP) ................. 2007-174754

(51) Int. Cl.
*A63F 9/24* (2006.01)
(52) U.S. Cl. .......................................... 463/31
(58) Field of Classification Search ............... 463/31
See application file for complete search history.

(56) References Cited

U.S. PATENT DOCUMENTS

| 5,372,365 A | * | 12/1994 | McTeigue et al. | 473/409 |
| 8,152,640 B2 | * | 4/2012 | Shirakawa et al. | 463/36 |
| 2006/0003298 A1 | | 1/2006 | Greenshpan et al. | |
| 2010/0035688 A1 | * | 2/2010 | Picunko | 463/39 |

FOREIGN PATENT DOCUMENTS

| JP | 2-209169 A | 8/1990 |
| JP | 9-325674 A | 12/1997 |
| JP | 2000-325661 A | 11/2000 |
| JP | 2001-353370 A | 12/2001 |
| JP | 2002-136762 A | 5/2002 |
| JP | 2006-320707 A | 11/2006 |
| WO | WO 2007/069751 A1 | 6/2007 |

OTHER PUBLICATIONS

International Search Report, Jul. 17, 2008, from International Phase of the instant application.

* cited by examiner

*Primary Examiner* — Pierre E Elisca
(74) *Attorney, Agent, or Firm* — Jackson Patent Law Office

(57) ABSTRACT

A mat unit 7 is provided with four foot switches SW1 to SW4 each of which detects stepping motion as input from a player. A processor 11 displays a player character 21 which travels in virtual space on a television monitor 5 on the basis of a result of detection by the mat unit 7, and furthermore arranges tasks 23L, 23C and 23L in the virtual space. The player chooses one which is different from the other two from among the tasks 23L, 23C and 23L. The processor 11 performs correctness/incorrectness determination on the basis of the result of the detection by the mat unit 7.

20 Claims, 12 Drawing Sheets

Fig. 4
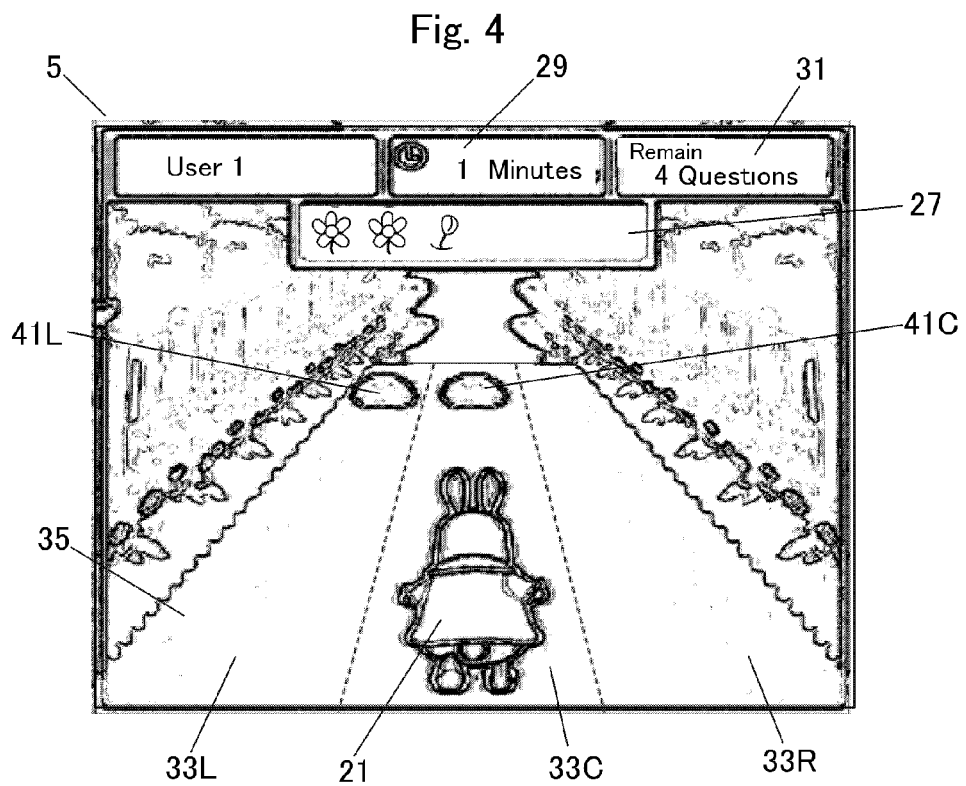
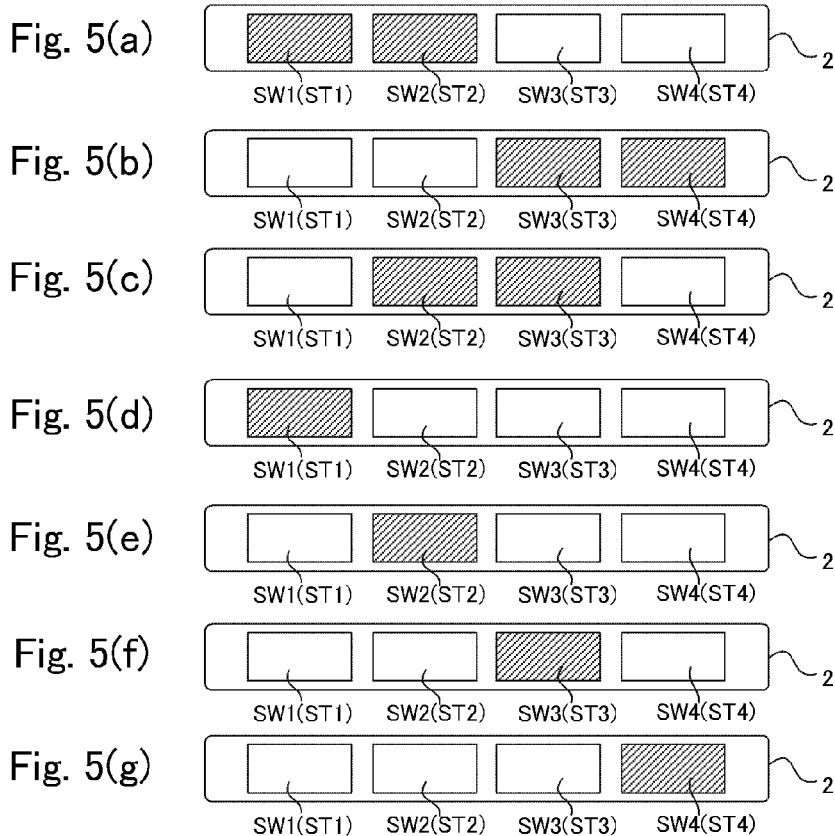

Fig. 6

| Motion of Player Character | | Motion Number | Animation Time (Player Character) | Animation Time (Background) | Two-Footed Contact Time tb | Average Step Interval ts |
|---|---|---|---|---|---|---|
| Stop | | 0 | — | — | tb > s1 | ts > s1 |
| Walking | Slow | 1 | To1 | Tb1 | tb ≥ s2 | s1 ≥ ts > t1 |
| Walking | Normal | 2 | To2 | Tb2 | tb ≥ s2 | t1 ≥ ts > t2 |
| Walking | Quick | 3 | To3 | Tb3 | tb ≥ s2 | t2 ≥ ts > t3 |
| Running | Slow | 4 | So1 | Tb4 | tb < s2 | s1 ≥ ts > u1 |
| Running | Normal | 5 | So2 | Tb5 | tb < s2 | u1 ≥ ts > u2 |
| Running | Quick | 6 | So3 | Tb6 | tb < s2 | u2 ≥ ts > u3 |

To1 > To2 > To3
So1 > So2 > So3
Tb1 > Tb2 > Tb3 > Tb4 > Tb5 > Tb6
s1 ≫ s2
s1 > t1 > t2 > t3
s1 > u1 > u2 > u3

Side Step Determination

Jumping Determination

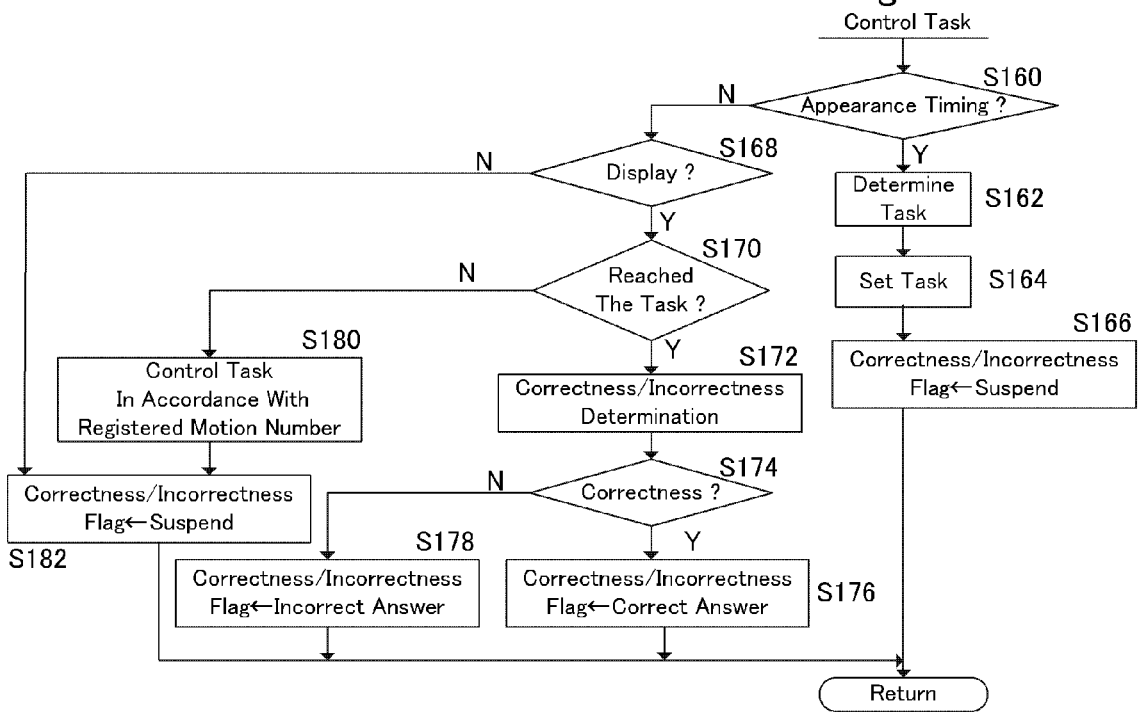
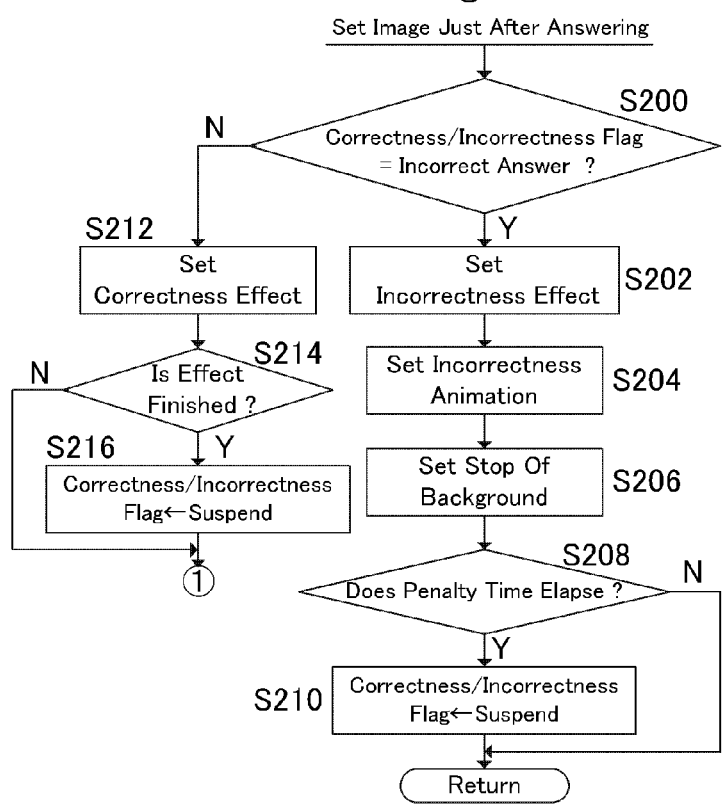

FOOT INPUT TYPE BRAIN TRAINING DEVICE AND COMPUTER PROGRAM

TECHNICAL FIELD

The present invention relates to a foot input type brain training apparatus and the related arts for training a brain.

BACKGROUND ART

In accordance with Patent Document 1, a player character displayed on a television monitor performs motions similar to various motions (a motionless state, a walking motion, a running motion, a side stepping motion, a jumping motion and a squatting motion) performed by a player on a mat type controller. Accordingly, the player can have an experience as if he were actually moving in virtual space through the player character by performing these motions on the mat type controller.

[Patent Document 1] Japanese Patent Published Application No. 2006-320707

DISCLOSURE OF THE INVENTION

Problem to be Solved by the Invention

However, it is an object of Patent Document 1 to make the player exercise by manipulating the player character.

It is therefore an object of the present invention to provide a brain training apparatus and the related arts capable of preventing from easily getting bored by traveling in virtual space and training a brain through input operation by feet.

Solution of the Problem

In accordance with a first aspect of the present invention, a foot input type brain training apparatus comprising: an input unit configured to include a plurality of detecting units each of which detects stepping motion as input from a player; a video controlling unit operable to display a vide image which represents travel in virtual space displayed in a display device based on a result of detection by said input unit; a task arranging unit operable to arrange a predetermined task in the virtual space; and an evaluating unit operable to evaluate based on the result of the detection by said input unit and the predetermined task.

In accordance with this configuration, the player performs the predetermined task by the input operation by the feet. Unlike the hands, since the feet are usually used only as moving means for walking and running, the input operation by the feet is usage of the feet which is not found in daily life. In this way, by performing the predetermined task with the usage of the feet which is not found in the daily life, it is possible to anticipate the further improvement of the work of the brain in comparison with the case where the hands are used.

Also, since it was reported that the prefrontal cortex of the brain was activated only by walking or running, it is possible to activate the prefrontal cortex of the brain even only by moving in the virtual space by the stepping motion. Accordingly, it is possible to anticipate the still further improvement of the work of the brain, coupled with the execution of the predetermined task.

Further, since the player can have an experience by performing the stepping motion as if he were actually moving in the virtual space, it is possible to provide the brain training apparatus which he does not get bored easily in comparison with the case where the predetermined task is excursively performed.

Still further, since the player repeatedly performs the tasks with the aim of training the brain by the brain training apparatus, it is possible to effectively train the brain of the player in comparison with the case where the tasks are excursively performed.

In this foot input type brain training apparatus, the predetermined task is a task which gives information to the player, makes the player memorize the information temporarily, and makes the player process the information.

In accordance with this configuration, it is possible to train the working memory of the player. In addition, since the input is performed using the legs, it is possible to train the working memory effectively. Efficacy of the usage of the feet is as previously described.

The working memory is a function for operating (processing) necessary information while temporarily holding (memorizing) the necessary information, and a part which serves a cognitive function in a brain. The working memory task is a task for making the player hold (memorize) necessary information temporarily and operate (process) the necessary information.

In other words, the predetermined task is a task by which activity of at least a part of a prefrontal cortex in a brain increases during the player performs the predetermined task by cooperation with input operation of the player by said input unit.

Still, in other words, the predetermined task is a task which yields a measurement result where electric activity or metabolic activity of nerves of at least a part of a prefrontal cortex in a brain increases when the electric activity or the metabolic activity of the nerves in the brain is measured during the player performs the predetermined task by input operation using said input unit.

Also, in the above foot input type brain training apparatus, the predetermined task may be a task which instructs to choose one or a predetermined number of ones from among plural ones.

In accordance with this configuration, It is possible to train input-choice ability of the player. In addition, since the input is performed using the feet, it is possible to effectively train the input-choice ability. Efficacy of the usage of the feet is as previously described.

The input-choice ability is ability of choosing necessary information item from among multiple and diverse information items.

In the above foot input type brain training apparatus, said video controlling unit detects motion of the player based on the result of the detection by said input unit, and displays the video image which represents the travel in the virtual space with speed in accordance with speed of the motion.

In accordance with this configuration, by implementing a content of having to move fast in the virtual space, the player has to try to move the legs more quickly so as to travel faster. It is noted that as the number of times of the motions of the legs within the fixed time is higher, the prefrontal cortex of the brain is more activated, and therefore it is possible to further contribute to the training of the brain.

In this foot input type brain training apparatus, said video controlling unit sequentially displays predetermined tasks with speed in accordance with the speed of the travel in the virtual space.

In accordance with this configuration, since the predetermined tasks are sequentially displayed in accordance with the moving speed of in the virtual space, as the moving speed is lower, the serial displays of the tasks are slower, while as it is higher, the serial displays of the tasks are faster. In this case, if the time limit is set, the moving speed has to be increased so as to perform many tasks. For this reason, since the player tries to move more quickly, the number of steps per fixed time increases, and thereby it is possible to further contribute to the training of the working memory. Also, it is good for the maintenance and improvement of health.

The above foot input type brain training apparatus further comprising: a course generating unit operable to generate a course for traveling in the virtual space, wherein said task arranging unit arranges a plurality of task objects which represent the predetermined task as a group on the course.

Also, this above foot input type brain training apparatus further comprising: a motion determining unit operable to determine which one of a plurality of predetermined motion patterns motion of the player corresponds to based on a result of detection by the detecting unit, wherein the plurality of the predetermined motion patterns are a part or all of a motionless state, a walking motion, a running motion, a side stepping motion, and a jumping motion, wherein the course is divided into a plurality of areas along a traveling direction, wherein said task arranging unit aligns the plurality of the task objects by displaying the task object on each of the areas, wherein said video controlling unit displays the video image representing the travel on the single area if the motion pattern determined by said motion determining unit corresponds to any one of the motionless state, the walking motion, the running motion, and the jumping motion, and wherein said video controlling unit displays the video image representing a shift from the one area to the other area if the motion pattern determined by said motion determining unit corresponds to the side stepping motion.

The above foot input type brain training apparatus further comprising: a disturbing unit operable to display an image for disturbing the player on said display device.

In accordance with this configuration, the disturbance object disturbs the player so as to obstruct the execution of the predetermined task. The player has to get the correct answer without being affected thereby. It is hereby possible to train the disturbance-exclusion ability of the player.

The disturbance-exclusion ability is ability of excluding unnecessary information for oneself.

The above foot input type brain training apparatus further comprising: a motion controlling unit operable to display a player character on said display device, and control motion of the player character based on the result of the detection of said input unit.

In accordance with this configuration, the player can operate the player character through the stepping motion. Accordingly, the player can have an experience as if he were actually moving in virtual space through the player character by performing the stepping motion. As the result, the player can perform the predetermined task while having the simulated experience in the virtual space through the player character.

Also, in the above foot input type brain training apparatus, said video controlling unit may display the video image which represents the travel in the virtual space in a first person viewpoint based on the result of the detection of said input unit.

In accordance with this configuration, the player can have an experience as if he were actually moving in virtual space by performing the stepping motion. As the result, the player can perform the predetermined task while having the simulated experience in the virtual space.

In accordance with a second aspect of the present invention, a computer program for causing a computer to function as a foot input type brain training apparatus, comprising the steps of: displaying a vide image which represents travel in virtual space displayed in a display device based on a result of detection by an input unit including a plurality of detecting units each of which detects stepping motion as input from a player; arranging a predetermined task in the virtual space; and evaluating based on the result of the detection by said input unit and the predetermined task.

In accordance with this configuration, the same advantage as the above first aspect of the foot input type brain training apparatus can be gotten.

In accordance with a third aspect of the present invention, a computer readable medium embodying a computer program for causing a computer to function as a foot input type brain training apparatus, the computer program makes the computer execute the process comprising the steps of: displaying a vide image which represents travel in virtual space displayed in a display device based on a result of detection by an input unit including a plurality of detecting units each of which detects stepping motion as input from a player; arranging a predetermined task in the virtual space; and evaluating based on the result of the detection by said input unit and the predetermined task.

In accordance with this configuration, the same advantage as the above first aspect of the foot input type brain training apparatus can be gotten.

In the present specification and claims, the recording mediums include, for example, a flexible disk, a hard disk, a magnetic tape, a magneto-optical disk, a CD (including CD-ROM, Video-CD), a DVD (including DVD-Video, DVD-ROM, DVD-RAM), a ROM cartridge, a RAM memory cartridge with a battery backup unit, a flash memory cartridge, a nonvolatile RAM cartridge, and so on.

BRIEF DESCRIPTION OF DRAWINGS

The novel features of the present invention are set forth in the appended any one of claims. The invention itself, however, as well as other features and advantages thereof, will be best understood by reference to the detailed description of specific embodiments which follows, when read in conjunction with the accompanying drawings, wherein:

FIG. 4 is a view showing another example of a training screen as displayed on the television monitor 5 of FIG. 1.

FIG. 5 is a schematic diagram showing the on/off patterns of the foot switches SW1 to SW4 of the mat 2 of FIG. 1.

FIG. 6 is an explanatory view of the table showing the relation among the motion of the player character 21, the motion number, the animation time of the player character 21, the animation time of the background, the two-footed contact time, and the average step interval.

FIG. 15 is a flow chart showing an example of the process of controlling the setting of the question in step S21 of FIG. 7.

FIG. 16 is a flow chart showing an example of the process of setting the image just after answering in step S152 of FIG. 14.

EXPLANATION OF REFERENCES

1 . . . adapter, 3 . . . cartridge, 4 . . . circuit box, 5 . . . television monitor, 6 . . . infrared filter, 7 . . . mat unit, 8 . . . power supply switch, 9 . . . AV cable, 11 . . . processor, 13 . . . external memory, 15 . . . IR receiver, 17 . . . MCU, 19 . . . IR emission unit, 21 . . . player character, 23 (23L, 23C, and 23R) . . . task panel, 25 . . . disturbance object, 33 (33L, 33C, and 33R) . . . lane, 35 . . . road image, 40 . . . NIRS body, 42 . . . probe, 44 . . . monitor, and SW1 to SW4 . . . foot switch.

BEST MODE FOR CARRYING OUT THE INVENTION

In what follows, several embodiments of the present invention will be explained in detail with reference to the accompanying drawings. Meanwhile, like references indicate the same or functionally similar elements throughout the respective drawings, and therefore redundant explanation is not repeated.

Figure 1:
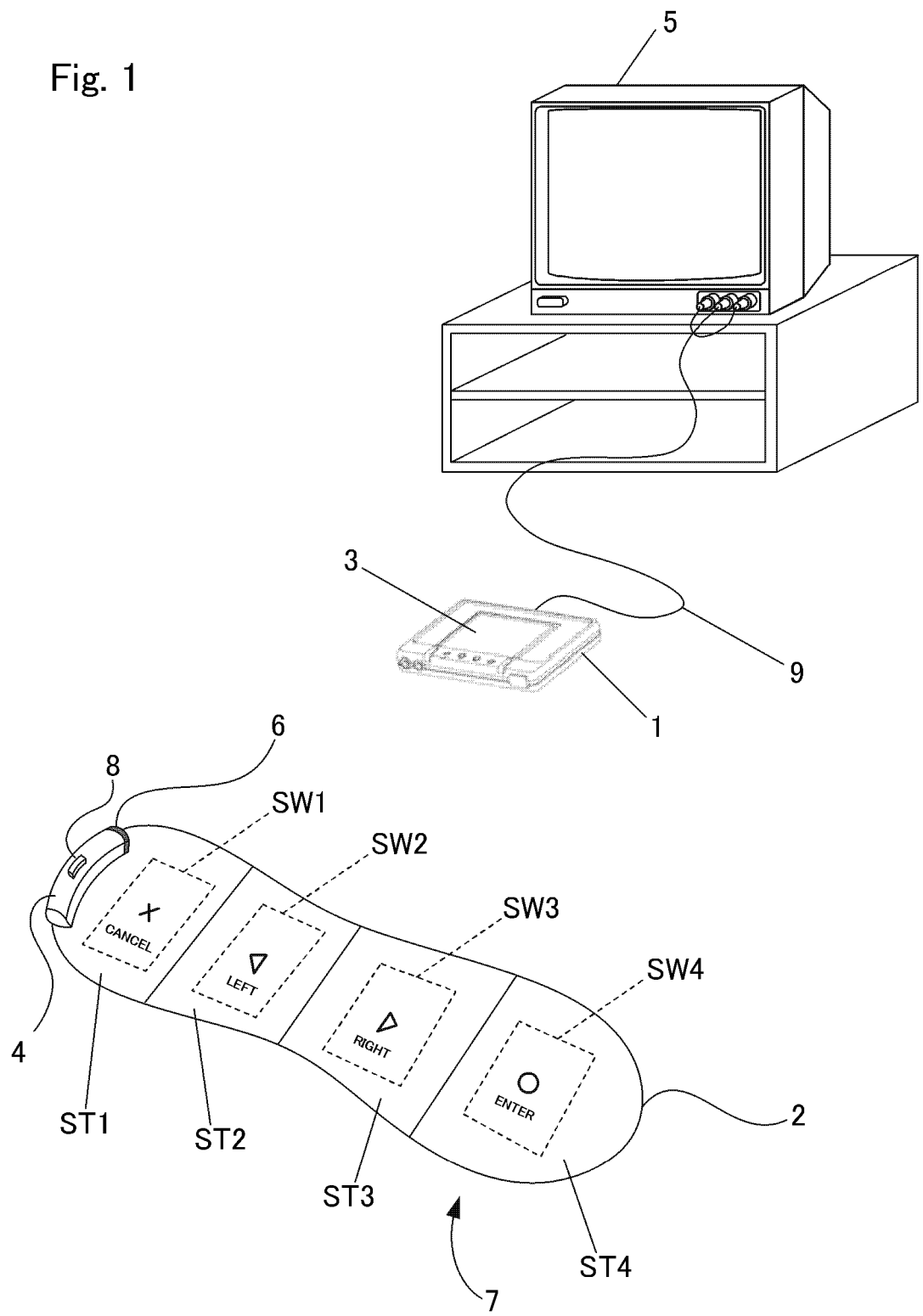
FIG. 1 is a view showing the overall configuration of a mat system in accordance with an embodiment of the present invention.

FIG. 1 is a view showing the overall configuration of a mat system in accordance with an embodiment of the present invention. Referring to FIG. 1, the mat system includes an adapter 1, a cartridge 3, a mat unit 7, and a television monitor 5. The cartridge 3 is inserted into the adapter 1. On the other hand, the adapter 1 is connected to the television monitor 5 through an AV cable 9.

The mat unit 7 comprises a mat 2 and a circuit box 4. The circuit box 4 is fixed to one end of the mat 2. The circuit box 4 is provided with a power supply switch 8 at its upper surface and an infrared filter 6 which transmits only infrared light at one end thereof. An infrared (IR) emission unit 19 (to be described below) is located behind this infrared filter 6. On the other hand, four step areas ST1, ST2, ST3 and ST4 are formed in the surface of the mat 2. The mat 2 is also provided with foot switches SW1, SW2, SW3 and SW4 inside thereof corresponding respectively to the step areas ST1, ST2, ST3 and ST4. When one of the step areas ST1, ST2, ST3 and ST4 is stepped on, the corresponding one of the foot switches SW1, SW2, SW3 and SW4 is turned on.

Figure 2:
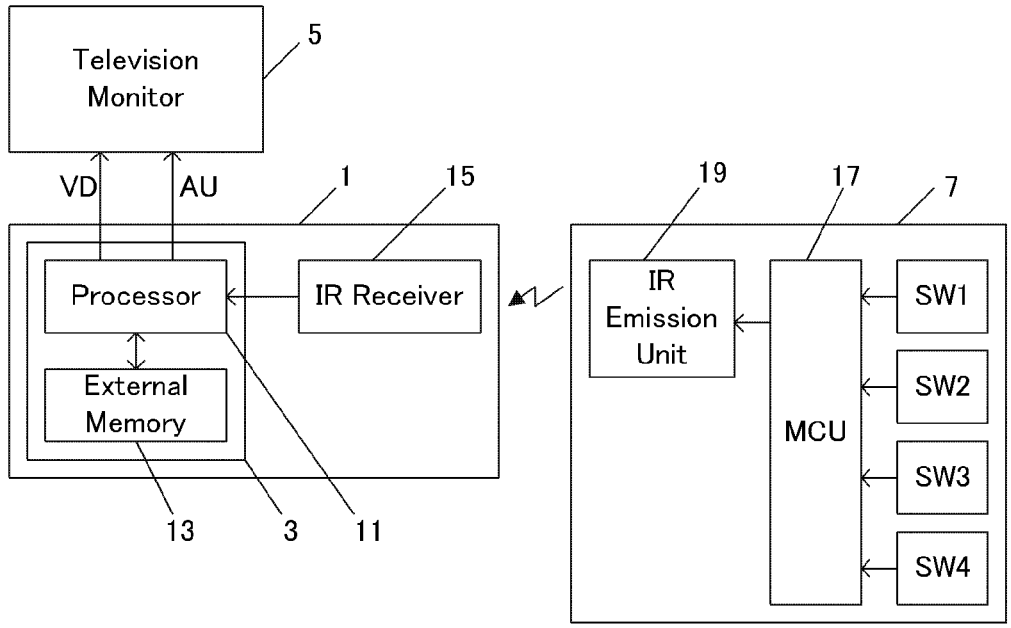
FIG. 2 is a schematic diagram for showing the electric configurations of the mat system of FIG. 1.

FIG. 2 is a schematic diagram for showing the electric configurations of the mat system of FIG. 1. Referring to FIG. 2, the mat unit 7 includes the infrared (IR) emission unit 19 having an infrared emitting diode, an MCU (microcontroller unit) 17, and the foot switches SW1 to SW4. The IR emission unit 19 and the MCU 17 are housed in the circuit box 4. The foot switches SW1 to SW4 are located inside of the mat 2. The MCU 17 receives on/off information from the foot switches SW1 to SW4, and transmits the on/off information from the foot switches SW1 to SW4 to an IR receiver 15 of the adapter 1 via infrared communication by driving the IR emission unit 19.

The cartridge 3 to be inserted into the adapter 1 includes a processor 11 and an external memory 13 (being composed of a flash memory, a ROM, and/or a RAM, or the like) while the adapter 1 includes the infrared (IR) receiver 15. The infrared signal transmitted from the IR emission unit 19 of the mat unit 7, i.e., the on/off information of the foot switches SW1 to SW4 is received by the IR receiver 15 of the adapter 1, and is given to the processor 11 of the cartridge 3.

The processor 11 is coupled with the external memory 13. The external memory 13 stores an application program, image data, audio data, and so on. The application program includes computer programs for making the processor 11 execute various operations such as control of video and audio for making the user perform a task, detection of input from the user, correctness/incorrectness determination, and so on. The image data includes image data items which constitute various screens to be displayed on the television monitor 5. The audio data includes audio data items for voice of guidance, music, and sound effect.

The processor 11 executes the application program, fetches the image data and the audio data, performs necessary processes thereto, and generates a video signal VD and an audio signal AU. The video signal VD and the audio signal AU are supplied to the television monitor 5 through the AV cable 9 from the adapter 1. As the result, the various screens are displayed on the television monitor 5, and the user steps on the mat 2 while seeing them, and performs the tasks. And, the processor 11 performs the processing in accordance with the application program on the basis of the on/off information of the foot switches SW1 to SW4 from the IR receiver 15.

Although not shown in the figure, the processor 11 includes various functional blocks such as a CPU (central processing unit), a graphics processor, a sound processor, and a DMA controller, and in addition to this, includes an ND converter for receiving analog signals, an input/output control circuit for receiving input digital signals such as key manipulation signals and infrared signals (the on/off information of the foot switches SW1 to SW4 in the present embodiment) and giving the output digital signals to external devices, an internal memory, and so on.

The CPU executes the application program stored in the external memory 13. The CPU receives the digital signals from the ND converter and the digital signals from the input/output control circuit, and then executes necessary operations based on these signals in accordance with the application program. The graphics processor performs graphics processing, which the result of the operation of the CPU requires, to the image data stored in the external memory 13 to generate the video signal VD representing images to be displayed on the television monitor 5. The sound processor performs sound processing, which the result of the operation of the CPU requires, to the audio data stored in the external memory 13 to generate the audio signal AU representing necessary sound. The internal memory is, for example, a RAM, and is used as a working area, a counter area, a register area, a temporary data area, a flag area and/or the like area.

In the present embodiment, the mat system of FIGS. 1 and 2 is employed as a foot input type brain training system. In what follows, the brain training by the present system will be described referring to training screens to be displayed on the television monitor 5.

Figure 3:
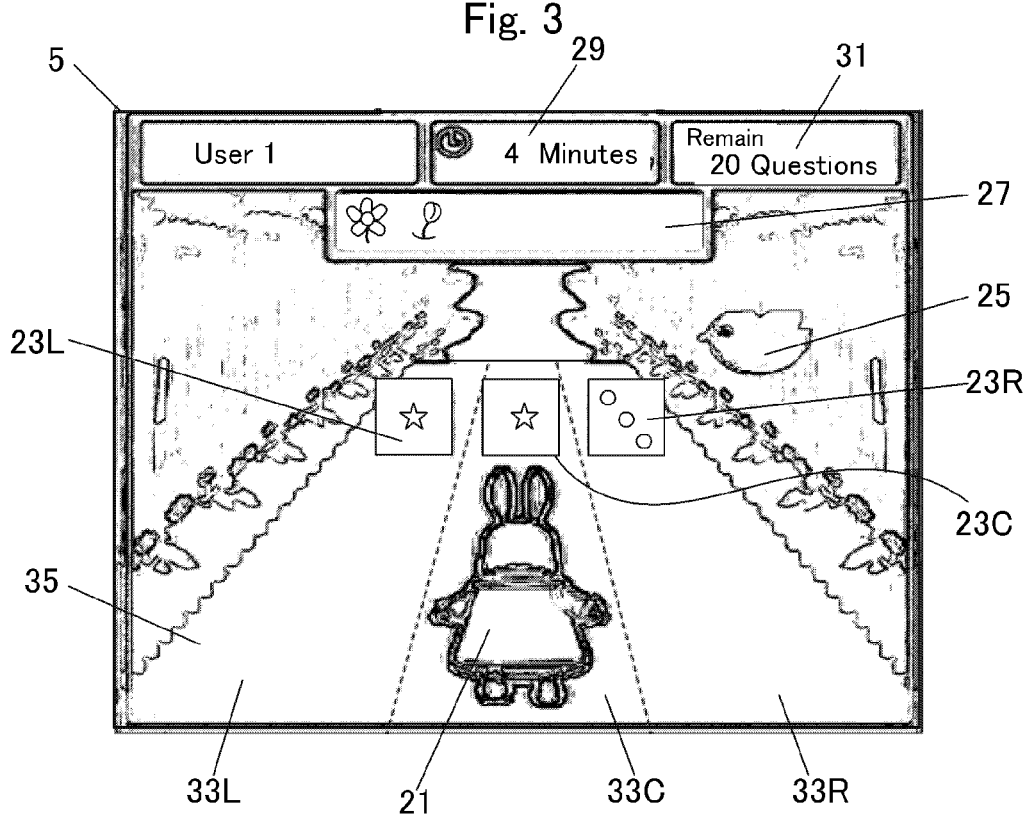
FIG. 3 is a view showing an example of a training screen as displayed on the television monitor 5 of FIG. 1.

FIG. 3 is a view showing an example of a training screen as displayed on the television monitor 5 of FIG. 1. Referring to FIG. 3, this training screen contains a player character 21, task panels 23L, 23C and 23R, a road image 35, a remaining time displaying section 29, a remaining task number displaying section 31, an evaluation displaying section 27, and a disturbance object 25. Incidentally, the respective task panels 23L, 23C and 23R are collectively referred to as the task panel 23.

When the player steps on the mat 2 of FIG. 1, the processor 11 detects the stepping by the player by receiving the on/off signals transmitted from the foot switches SW1 to SW4, and adjusts the animation speed of the background including the road image 35 and the animation speed of the player character 21 in accordance with the speed of stepping. This process provides a motion image depicting the player character 21 moving forward in accordance with the stepping speed of the player. Accordingly, as the stepping by the player is faster, the forward speed is faster, while as the stepping by the player is slower, the forward speed is slower. Incidentally, the term "forward" is used to indicate the "forward" in virtual space generated by the processor 11.

By the way, referring to FIGS. 3 and 5, the relation between the operation of the mat unit 7 by the player and the motion of the player character 21 will be described.

Referring to FIG. 3, the processor 11 performs the processing on the basis that the road image 35 consists of the left lane 33L, the center lane 33C, and the right lane 33R. In this case, the broken lines in the figure are for the convenience of the description and are not displayed actually. Also, the left lane 33L, the center lane 33C, and the right lane 33R are collectively referred to as the lane 33 respectively.

FIG. 5 is a schematic diagram showing the on/off patterns of the foot switches SW1 to SW4 of the mat 2 of FIG. 1. In FIG. 5, multiple diagonal lines are used to indicate the foot switches (step areas) which are turned on (stepped on).

When the mat 2 alternates the state shown in FIG. 5(d) and the state shown in FIG. 5(e), the player character 21 is displayed in order to move forward on the left lane 33L. When the mat 2 alternates the state shown in FIG. 5(e) and the state shown in FIG. 5(f), the player character 21 is displayed in order to move forward on the center lane 33C. When the mat 2 alternates the state shown in FIG. 5(f) and the state shown in FIG. 5(g), the player character 21 is displayed in order to move forward on the right lane 33R.

When the player jumps on the mat 2 in the state shown in FIG. 5(a), FIG. 5(c) or FIG. 5(b), the player character 21 is displayed in order to jump on the left lane 33L, the center lane 33C or the right lane 33R respectively.

When the stepping position of the player shifts from the state shown in FIG. 5(d) and FIG. 5(e) to the state shown in FIG. 5(e) and FIG. 5(f), the player character 21 moves from the left lane 33L to the center lane 33C. When the stepping position of the player shifts from the state shown in FIG. 5(d) and FIG. 5(e) to the state shown in FIG. 5(f) and FIG. 5(g), the player character 21 moves from the left lane 33L to the right lane 33R.

When the stepping position of the player shifts from the state shown in FIG. 5(e) and FIG. 5(f) to the state shown in FIG. 5(d) and FIG. 5(e), the player character 21 moves from the center lane 33C to the left lane 33L. When the stepping position of the player shifts from the state shown in FIG. 5(e) and FIG. 5(f) to the state shown in FIG. 5(f) and FIG. 5(g), the player character 21 moves from the center lane 33C to the right lane 33R.

When the stepping position of the player shifts from the state shown in FIG. 5(f) and FIG. 5(g) to the state shown in FIG. 5(e) and FIG. 5(f), the player character 21 moves from the right lane 33R to the center lane 33C. When the stepping position of the player shifts from the state shown in FIG. 5(f) and FIG. 5(g) to the state shown in FIG. 5(d) and FIG. 5(e), the player character 21 moves from the right lane 33R to the left lane 33L.

By the way, in this brain training, the one-time training is five minutes. And, the remaining time displaying section 29 of FIG. 3 displays the remaining time of the training. Also, in this brain training, the tasks of 20 questions are given in the one-time training. And, the remaining task number displaying section 31 displays the number of the remaining tasks. The task is given by displaying the task panels 23L, 23C and 23R on the left lane 33L, the center lane 33C and the right lane 33R respectively. In this case, the task panels 23L, 23C and 23R are displayed so as to align horizontally. The single task is composed of the task panels 23L, 23C and 23R. Also, the tasks are located at predetermined distance intervals on the road 35 in the virtual space created in the screen. In the road 35, the interval between one task and the next task is called a road segment.

The processor 11 gives the player the question "Operate the player character by the mat, and choose one task panel different from the other two ones from among the three task panels." with the image and/or voice. The player performs the task in accordance with it. It is possible to train input-choice ability (ability of choosing necessary information item from among multiple and diverse information items) of the player. In addition, since the input is performed using the feet, it is possible to effectively train the input-choice ability.

In this case, the choice is performed by shifting the player character 21 to the lane 33 where the task panel 23 to be chosen is placed and advancing the player character 21 to the task panel 23 to be chosen.

The processor 11 displays a plant in the evaluation displaying section 27 if the answer is correct. In this case, the plant is represented in three stages which are a bud, a beginning of blossoming, and blossoming. The first stage is the bud, and the stage is advanced to the next stage by one correct answer. And, if the plant blossoms, in the next correct answer, a plant is displayed next thereto in the same manner.

When the remaining time becomes 0 in the remaining time displaying section 29 and the time limit is run past, even the tasks of the twenty questions are not completed, the training is finished. Accordingly, the player tries to answer all the questions within the time limit by stepping as quickly as possible, advancing the player character 21 with the high speed, causing the emergence of the tasks one after the other, and answering quickly. Incidentally, since the tasks are located at predetermined distance intervals in the virtual space, it is possible to cause the emergence of all the tasks by advancing the player character 21 with the high speed. On the other hand, if the forward speed of the player character 21 is slow, it is impossible to cause the emergence of all the tasks.

The disturbance object 25 horizontally reciprocates at constant speed in the screen. The disturbance object 25 bears no relationship to the task and is unnecessary information, and therefore the player has to perform the task without being affected thereby. Accordingly, it is possible to train disturbance-exclusion ability (ability of excluding unnecessary information for the player) of the player by displaying the disturbance object 25.

FIG. 4 is a view showing another example of a training screen as displayed on the television monitor 5 of FIG. 1. Referring to FIG. 4, this training screen contains obstacle objects 41L and 41C on the left lane 33L and the center lane 33C respectively. The obstacle objects 41L and 41C are displayed so as to align horizontally. Incidentally, the respective obstacle objects 41L, 41C, and 41R are collectively referred to as the obstacle object 41. The obstacle object 41R is an obstacle object to be displayed on the right lane 33R.

The player jumps the player character by operating the mat 2 to jump over the obstacle object 41L or 41C, and thereby moves forward. Or, the player operates the player character 21 by the mat 2 so as to advance on the right lane 33R where the obstacle objects 41L and 41C are not placed, and thereby moves forward. Accordingly, since the player has to instantly determine the way for avoiding the obstacle object 41, it is possible to train the input-choice ability of the player.

The processor 11 causes the emergence of the obstacle object 41 between one task and the next task, i.e., on the road segment. The road segment of the road 35 where the obstacle object 41 appears is determined in a random manner, and the lane 33 where the obstacle object 41 appears is also determined in a random manner. Also, the position in the road segment where the obstacle object 41 is placed is selected from among some candidate positions. The obstacle objects 41 may be displayed on all the lanes 33, or on two lanes 33, or the obstacle object 41 may be displayed on one lane 33.

FIG. 6 is an explanatory view of a table (hereinafter referred to as a "animation control table") showing the relation among the motion of the player character 21, the motion number, the animation time of the player character 21, the animation time of the background, the two-footed contact time, and the average step interval. As shown in FIG. 6, the motion numbers "0" to "6" are numbers assigned to the respective motions of the player character 21.

In the case of the present embodiment, motion images of the player character 21 are prepared corresponding respectively to a stop state, a walking state (slow walking, normal walking and quick walking), and a running state (slow running, normal running, quick running). More specifically speaking, these motion images include one image frame showing that the player character 21 stops, 12 image frames showing that the player character 21 walks, and 12 image frames showing that the player character 21 runs. In this description, with respect to an animation of the player character 21 or the background, the term "image frame" is used to represent one of the image elements (static images) of which the animation (motion image) is made up. Also, in the case of the present embodiment, there are 32 image frames as images of the background. Incidentally, the road image is a part of the background.

In this case, the slow walking, normal walking and quick walking of the player character 21 can be represented by adjusting the playback time (animation time) of the respective 12 image frames showing that the player character 21 walks and the playback time (animation time) of the background. In a like manner, the slow running, normal running and quick running of the player character 21 can be represented by adjusting the playback time (animation time) of the respective 12 image frames showing that the player character 21 runs and the playback time (animation time) of the background.

In other words, animation times T1, T2 and T3 are assigned to the slow walking, normal walking and quick walking respectively. Needless to say, T1>T2>T3. Also, animation times S1, S2 and S3 are assigned to the slow running, normal running and quick running respectively. Needless to say, S1>S2>S3. In the stop state, a single still image is continuously displayed.

Also, animation times "Tb1", "Tb2", "Tb3", "Tb4", "Tb5" and "Tb6" of the background are assigned respectively to the slow walking, normal walking, quick walking, the slow running, normal running and quick running. Incidentally, Tb1>Tb2>Tb3>Tb4>Tb5>Tb6. In the stop state, a single still image is continuously displayed.

The two-footed contact time "tb" of the player is the period of time for which two of the foot switches SW1 to SW4 are turned on at the same time. If the two-footed contact time "tb" is longer than a predetermined time "s1" (for example, 50 video frames), the stopping image of the player character 21 and the background which is stopped are displayed. If the two-footed contact time "tb" is not longer than the predetermined time "s1" but the two-footed contact time "tb" is not shorter than a predetermined time "s2" (for example, 7 video frames), the walking motion image of the player character 21 is displayed. On the other hand, if the two-footed contact time "tb" is smaller than the predetermined time "s2", the running motion image of the player character 21 is displayed.

Next, the average step interval "ts" will be explained. The step interval of the player is defined as the interval between the time when one foot switch of the foot switches SW1 to SW4 is turned on and the time when another foot switch is turned on. The average of such step intervals are called the average step interval "ts". In the case of the present embodiment, the average step interval "ts" is calculated as the average of latest four step intervals. Incidentally, the average step interval "ts" is calculated as an integer.

If the two-footed contact time "tb" as measured satisfies that tb>s1 or if the average step interval "ts" as calculated satisfies that ts>s1, the processor 11 selects the stop state (motion number "0"). Also, the processor 11 determines which of the two-footed contact time "tb" and the predetermined time "s2" is greater than the other, and selects either the walking state (motion numbers 1 to 3) or the running state (motion numbers 4 to 6) in accordance with the determination. Then, in the case where the motion state as selected is the walking state, the processor 11 selects the motion number (one of 1 to 3) corresponding to the range within which the average step interval "ts" falls. On the other hand, in the case where the motion state as selected is the running state, the processor 11 selects the motion number (one of 4 to 6) corresponding to the range within which the average step interval "ts" falls.

Furthermore, the processor 11 calculates the moving average "Mav" of the selected motion numbers. In the case of the present embodiment, the moving average "Mav" of the eight motion numbers as selected in the latest and past times (the following equation) is calculated. In the following equation, "Sum/8" is the moving average Mav calculated in the last time. Also, "Sum" is "Sum #" used so as to calculate the moving average Mav calculated in the last time. Incidentally, the moving average "Mav" is obtained as an integer.

$$\text{Sum\#} = \text{Sum} - (\text{Sum}/8) + \text{the latest motion number} \quad (1)$$

$$\text{Mav} = \text{Sum\#}/8 \quad (2)$$

Then, the processor 11 refers to the animation control table, and generates the animation of the player character 21 and the background in the motion state assigned to the same motion number as the value of the moving average "Mav".

Figure 7:
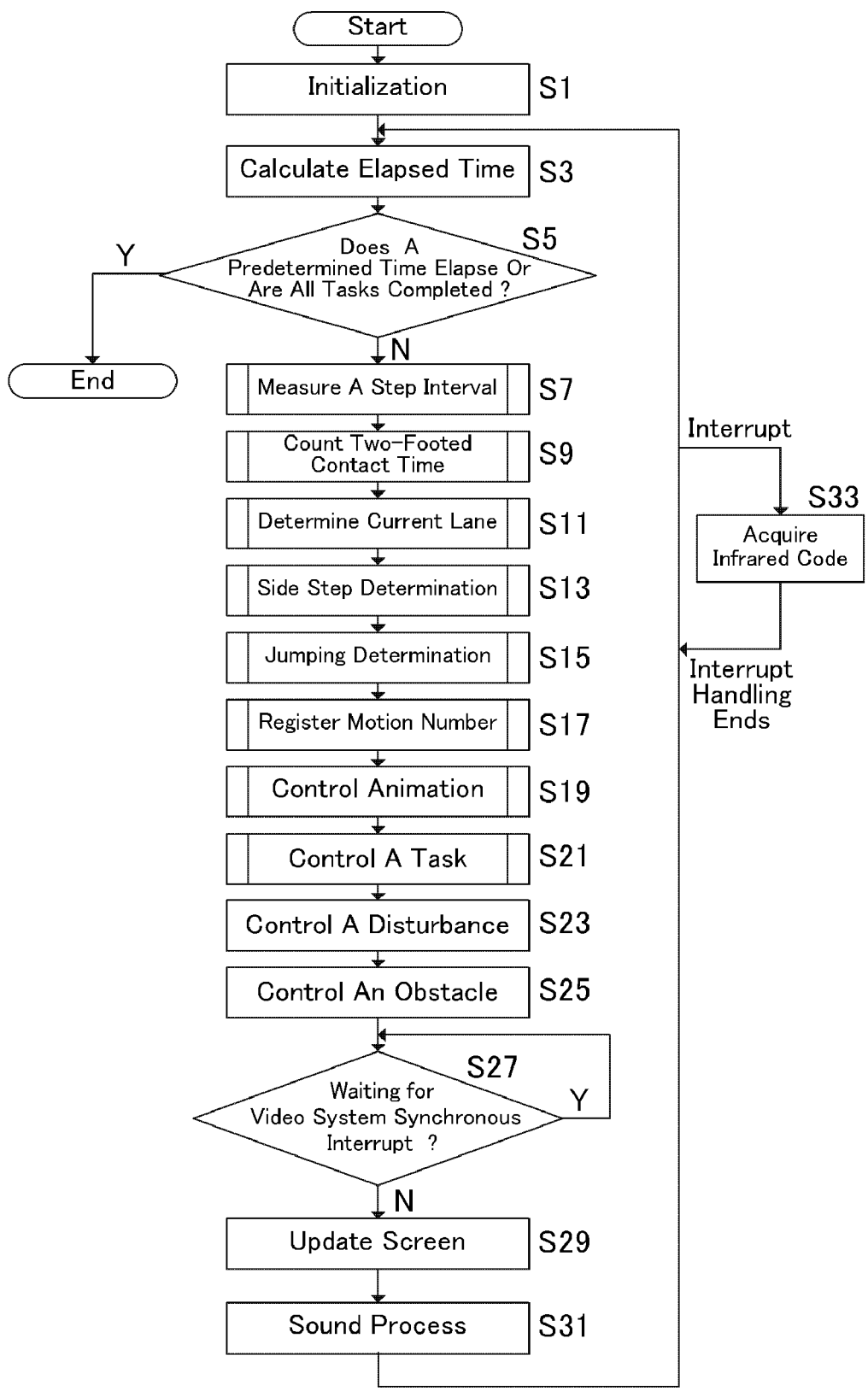
FIG. 7 is a flow chart showing an example of the overall process flow by the processor 11 of FIG. 2.

FIG. 7 is a flow chart showing an example of the overall process flow by the processor 11 of FIG. 2. Referring to FIG. 7, the processor 11 performs the general initialization of the system in step S1. Specifically, the system and the respective variables are initialized.

In step S3, the processor 11 calculates the elapsed time from the start time. In the case of the present embodiment, since the video frame is updated at 1/60 second intervals (in step S27 to be described below), the elapsed time can be calculated by counting the video frames when updated. In step S5, the processor 11 determines whether or not a predetermined time (for example, five minutes) elapses, and whether or not the setting of all the tasks (for example, 20 questions) is completed, and if the predetermined time elapses or the setting of all the tasks is completed, the processor 11 finishes the process.

In step S7, the processor 11 measures the step interval of the player and calculates the average step interval "ts". In step S9, the processor 11 counts the two-footed contact time "tb" of the player.

In step S11, the processor 11 determines the lane (referred to hereinafter as the "current lane") on which the player character 21 is positioned in the next video frame on the basis of the information of the past lane and the latest on/off information of the foot switches SW1 to SW4. The past lane is the lane on which the player character 21 being currently displayed is positioned.

In step S13, the processor 11 determines whether or not the player performs a side step on the basis of the information about the current lane and the past lane. In step S15, the processor 11 determines whether or not the player jumps. More specifically speaking, in the case where the two-footed contact time "tb" is longer than the predetermined time "tj" (for example, 10 video frames) just before the no input state (in which all the foot switches SW1 to SW4 are turned off), it is determined that the player jumps.

In step S17, the processor 11 acquires the motion number on the basis of the animation control table (refer to FIG. 6). In step S19, the processor 11 controls the animation of the background and the animation of the player character 21 in accordance with the acquired motion number. In step S21, the processor 11 controls the task (the task panels 23L, 23C, and 23R) to be set. In step S23, the processor 11 controls the image and the position of the disturbance object 25 (sets display position information and storage location information of image data in the internal memory). In step S25, the processor 11 controls the appearance, the image and the position of the obstacle object 41 (sets display position information and storage location information of image data in the internal memory).

If there is an interrupt by a video system synchronous signal in step S27, the processor 21 proceeds to step S29, conversely if the interrupt is waited for, the process repeats the same step S27. For example, the interrupt by the video system synchronous signal is issued at 1/60 second intervals.

In response to the interrupt by the video system synchronous signal, in step S29, the processor 11 updates the display image (video frame) of the television monitor 5 on the basis of the results of the processes in steps S19, S21, S23 and S25. Also, in response to the interrupt by the video system synchronous signal, the sound process in step S31 is performed, and thereby voice guidance, music, sound effects, and so on are output. Thereafter, the processing proceeds to step S3.

When the signal transmitted from the IR receiver 15 of the adapter 1 rises from a low level to a high level, an interrupt is issued in response to this, and thereby the processor 11 starts the process of acquiring an infrared code (IR code) in step S33. After starting, the processor 11 performs the IR code acquiring process in response to timer interrupts.

Figure 8:
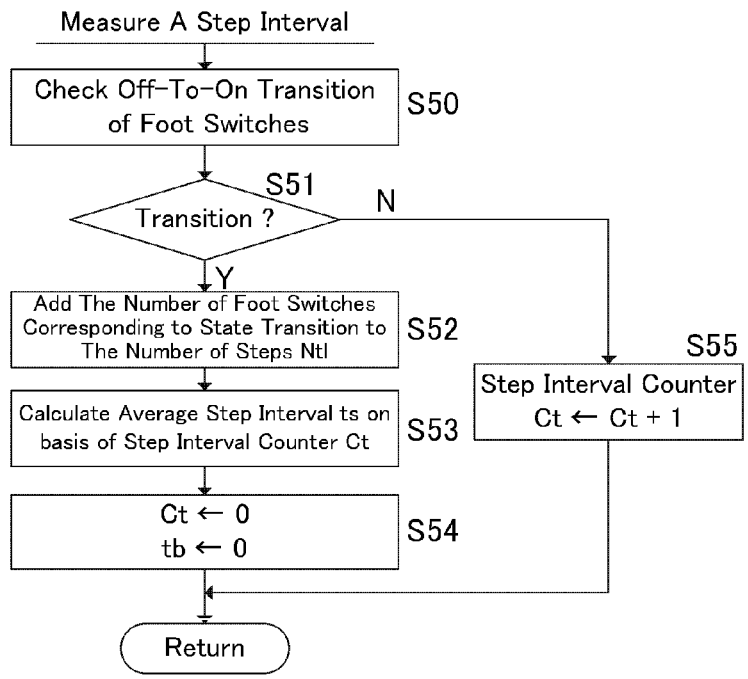
FIG. 8 is a flow chart showing an example of the process of measuring the step interval in step S7 of FIG. 7.

FIG. 8 is a flow chart showing an example of the process of measuring the step interval in step S7 of FIG. 7. As shown in FIG. 8, in step S50, the processor 11 checks the foot switches SW1 to SW4 as to whether or not there is an off-to-on state transition on the basis of the IR code as acquired at the previous time (the on/off information of the foot switches SW1 to SW4) and the IR code as acquired at the current time (the on/off information of the foot switches SW1 to SW4). If the state transition occurs in step S51, the processor 11 proceeds to step S52, otherwise proceeds to step S55.

In step S55, the processor 11 increments a step interval counter Ct indicative of the step interval of the player by one, and returns to the main routine. On the other hand, in step S52, the processor 11 adds the number of foot switches, the states of which are changed from an off-state to an on-state, to the number of count "Ntl". In other words, the number of count "Ntl" indicates the total number of off-to-on state transitions. The final result of the number of count "Ntl" is the total number of steps performed by the player. In step S53, the processor 11 calculates the average value (average step interval) "ts" of the total four values of the step interval counter "Ct" in the latest and past times. Then, in step S54, the processor 11 clears the step interval counter "Ct" and a two-footed contact counter "tb" indicative of the two-footed contact time of the player, and returns to the main routine. Incidentally, the value of the step interval counter "Ct" in the past time as shown in step S53 is a value of the counter "Ct" just before the reset in the past step S54.

Figure 9:
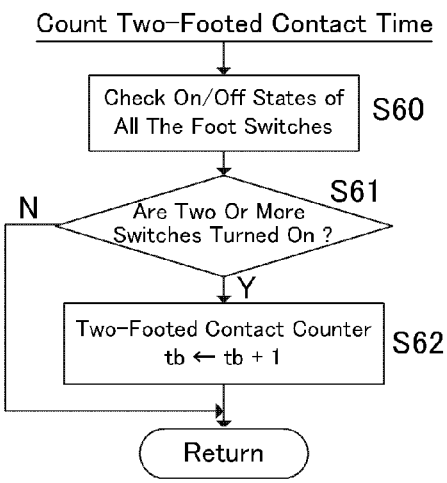
FIG. 9 is a flow chart showing an example of the process for counting the two-footed contact time in step S9 of FIG. 7.

FIG. 9 is a flow chart showing an example of the process for counting the two-footed contact time in step S9 of FIG. 7. Referring to FIG. 9, the processor 11 checks the IR code as acquired at the current time, i.e., the on/off information of the foot switches SW1 to SW4 in step S60. If two or more foot switches are turned on in step S61, the processor 11 proceeds to step S62 in which the two-footed contact counter "tb" is incremented by one, otherwise returns to the main routine.

Figure 10:
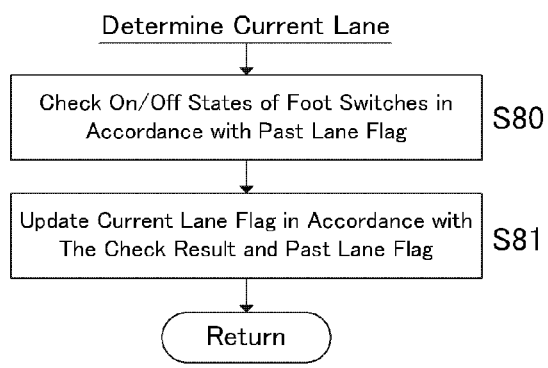
FIG. 10 is a flow chart showing an example of the process for determining the current lane in step S11 of FIG. 7.

FIG. 10 is a flow chart showing an example of the process for determining the current lane in step S11 of FIG. 7. As shown in FIG. 10, in step S80, the processor 11 checks the IR code as acquired at the current time, i.e., the on/off information of the foot switches SW1 to SW4 in accordance with a flag indicative of the past lane (hereinafter referred to as a "past lane flag"). More specifically speaking, in the case where the past lane flag indicates the left lane 33L, the on/off information of the foot switches SW3 and SW4 is checked. In the case where the past lane flag indicates the center lane 33C, the on/off information of the foot switches SW1 and SW4 is checked. In the case where the past lane flag indicates the right lane 33R, the on/off information of the foot switches SW1 and SW2 is checked.

In step S81, the processor 11 sets a flag indicative of the current lane (hereinafter referred to as a "current lane flag") to an appropriate value based on the check result in step S80 and the value of the past lane flag. More specifically speaking, in the case where the past lane flag indicates the left lane 33L, the current lane flag is set to a value indicative of the center lane 33C if the foot switch SW3 is turned on, and the current lane flag is set to a value indicative of the right lane 33R if the foot switch SW4 is turned on. In the case where the past lane flag indicates the center lane 33C, the current lane flag is set to a value indicative of the left lane 33L if the foot switch SW1 is turned on, and the current lane flag is set to a value indicative of the right lane 33R if the foot switch SW4 is turned on. In the case where the past lane flag indicates the right lane 33R, the current lane flag is set to a value indicative of the center lane 33C if the foot switch SW2 is turned on, and the current lane flag is set to a value indicative of the left lane 33L if the foot switch SW1 is turned on.

Figure 11:
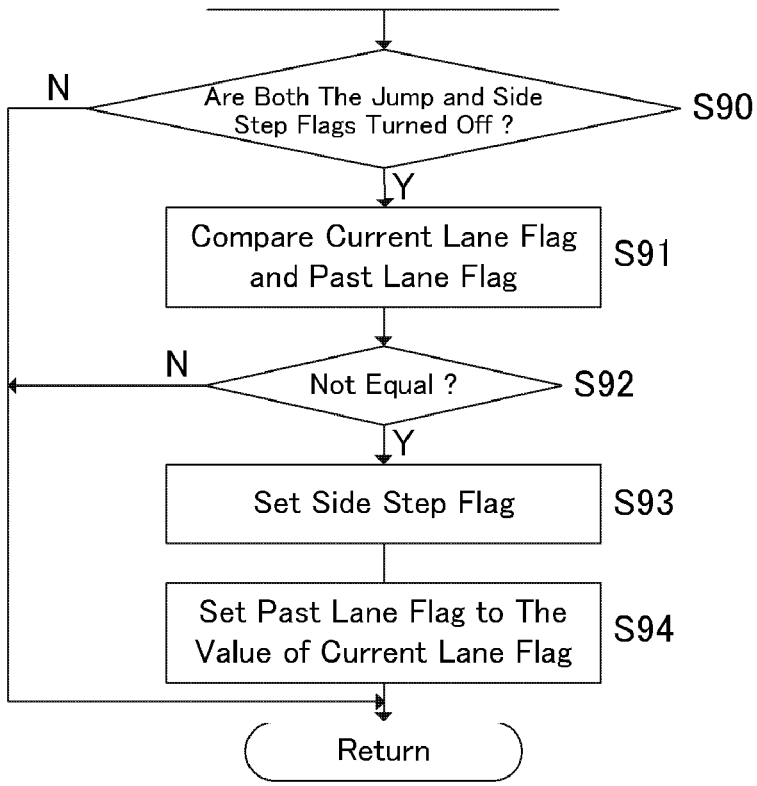
FIG. 11 is a flow chart showing an example of the side step determination process in step S13 of FIG. 7.

FIG. 11 is a flow chart showing an example of the side step determination process in step S13 of FIG. 7. As shown in FIG. 11, in step S90, the processor 11 accesses a jump flag indicating that the player character 21 is jumping, and a side step flag indicating that the player character 21 is laterally moving (side stepping), and if all these flags are turned off ("0"), the process proceeds to step S91, otherwise returns to the main routine. In step S91, the processor 11 compares the current lane flag and the past lane flag. If the lane indicated by the current lane flag is different from the lane indicated by the past lane flag in step S92, the processor 11 proceeds to step S93. In other words, if the value of the current lane flag is different from the value of the past lane flag, it means that the lane on which the player character 21 is displayed is changed in the next video frame.

Accordingly, in step S93, the processor 11 sets the side step flag to an appropriate value corresponding to the change of the lane. There are the change from the left lane 33L to the center lane 33C, change from the left lane 33L to the right lane 33R, change from the center lane 33C to the left lane 33L, change from the center lane 33C to the right lane 33R, change from the right lane 33R to the center lane 33C, and change from the right lane 33R to the left lane 33L as kinds of the changes of the lane. Accordingly, the side step flag is set to one of values which indicate these changes. Incidentally, if the lane is not changed, the side step flag is turned off ("0"). In step S94, the processor 11 sets the past lane flag to the value of the current lane flag, and returns to the main routine.

Figure 12:
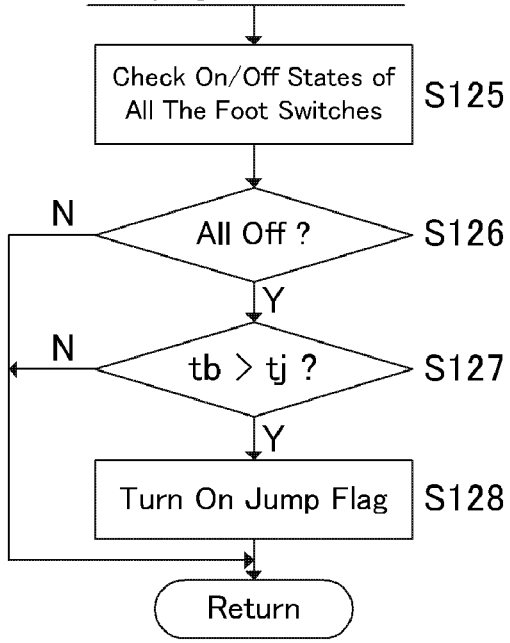
FIG. 12 is a flow chart showing an example of the jumping determination process in step S15 of FIG. 7.

FIG. 12 is a flow chart showing an example of the jumping determination process in step S15 of FIG. 7. Referring to FIG. 12, the processor 11 checks the on/off information of the foot switches SW1 to SW4 with reference to the IR code as acquired at the current time in step S125. When all the foot switches SW1 to SW4 are turned off in step S126, the processor 11 proceeds to step S127, otherwise returns to the main routine.

In step S127, if the value of the two-footed contact counter "tb" (i.e., the two-footed contact time "tb") is larger than the predetermined time "tj", the processor 11 determines that the player jumps and proceeds to step S128, otherwise returns to the main routine. In step S128, the processor 11 turns on the jump flag, and returns to the main routine.

Figure 13:
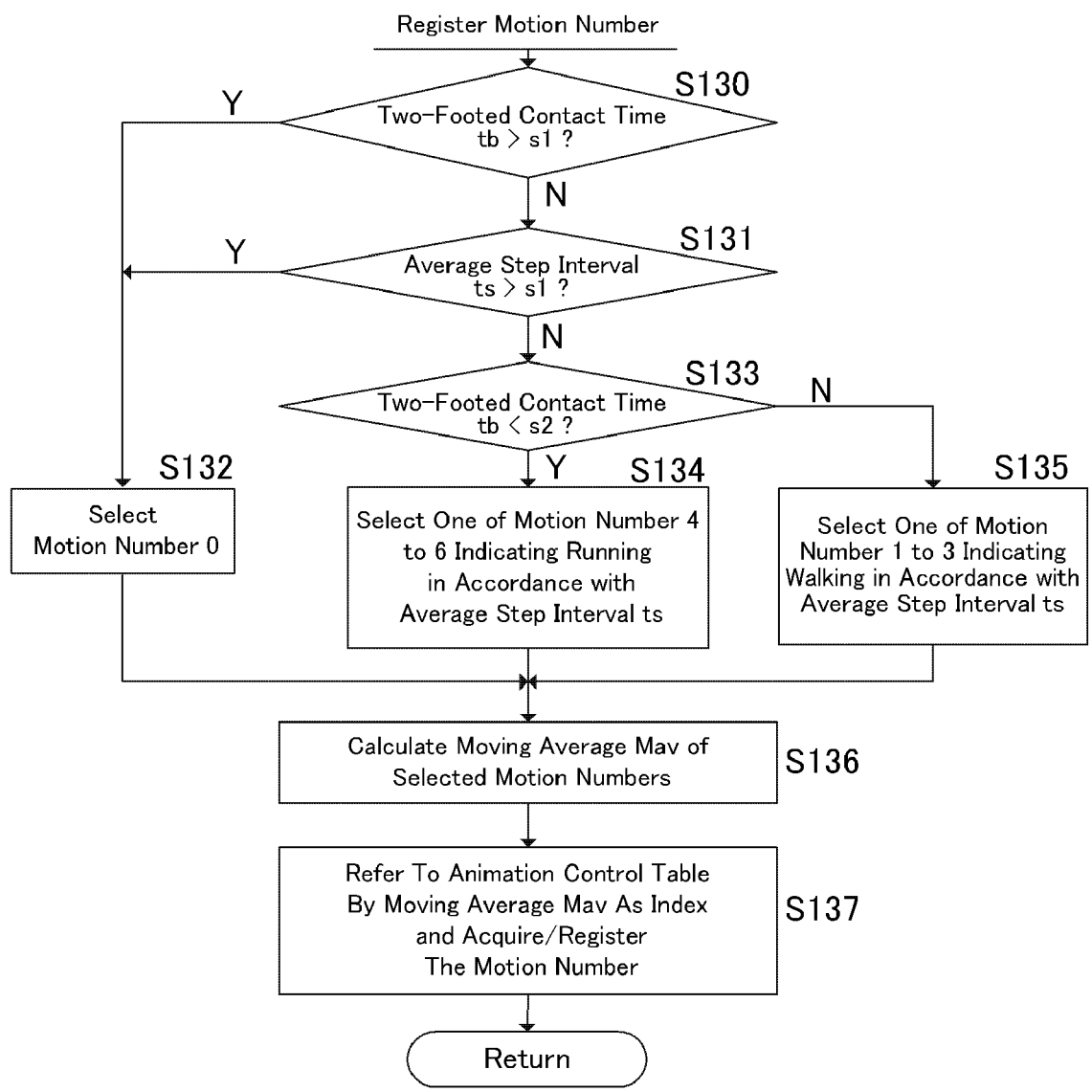
FIG. 13 is a flow chart showing an example of the process of registering the motion number in step S17 of FIG. 7.

FIG. 13 is a flow chart showing an example of the process of registering the motion number in step S17 of FIG. 7. Referring to FIG. 13 and FIG. 6, in step S130, the processor 11 determines whether or not the two-footed contact time "tb" is larger than the constant number "s1", and if it is larger the process proceeds to step S132, otherwise proceeds to step S131. In step S131, the processor 11 determines whether or not the average step interval "ts" is larger than the constant number "s1", and if it is larger the process proceeds to step S132, otherwise proceeds to step S133.

In step S132, the processor 11 selects the motion number "0". On the other hand, in step S133, the processor 11 determines whether or not the two-footed contact time "tb" is smaller than the constant number "s2", and if it is smaller the process proceeds to step S134, otherwise proceeds to step S135.

In step S134, the processor 11 selects a motion number (4, 5 or 6) corresponding to the range (s1≧ts>u1, u1≧ts>u2, or u2≧ts>u3) within which the average step interval "ts" falls. The motion numbers 4 to 6 are used to indicate the running state respectively. On the other hand, in step S135, the processor 11 selects a motion number (1, 2 or 3) corresponding to the range (s1≧ts>t1, t1≧ts>t2, or t2≧ts>t3) within which the average step interval "ts" falls. The motion numbers 1 to 3 are used to indicate walking states respectively.

In step S136, the processor 11 calculates the moving average "Mav" of the motion numbers selected in step S132, S134 or S135 on the basis of the equation (1) and the equation (2). In step S137, the processor 11 refers to the animation control table by the moving average "Mav" of the motion number as an index, and acquires and registers the motion number. Then, the process returns to the main routine.

Figure 14:
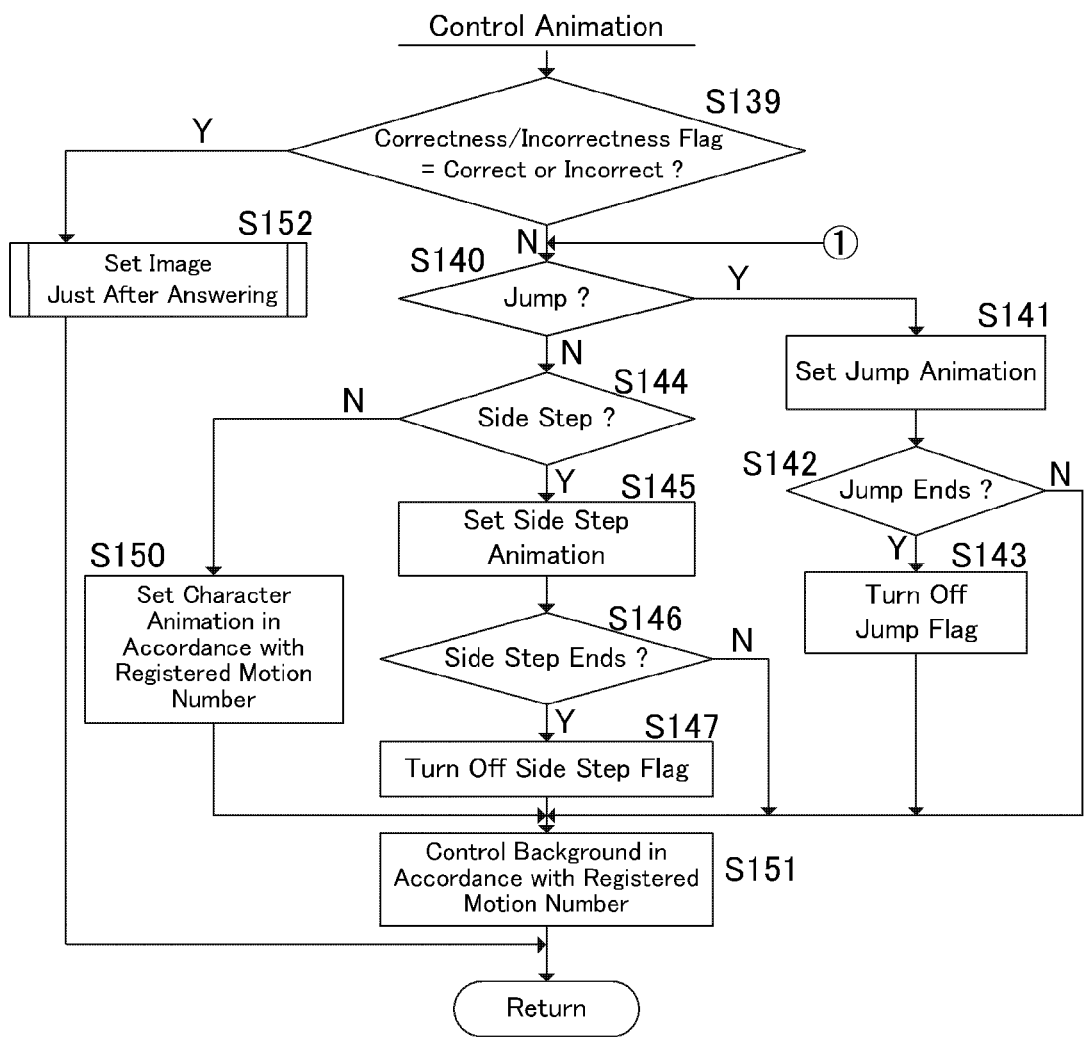
FIG. 14 is a flow chart showing an example of the process of controlling the animation in step S19 of FIG. 7.

FIG. 14 is a flow chart showing an example of the process of controlling the animation in step S19 of FIG. 7. Referring to FIG. 14, in step S139, the processor 11 checks a correctness/incorrectness flag indicating an execution result of the task by the player, and the process proceeds to step S152 if the correctness/incorrectness flag indicates the "correct answer" or "incorrect answer", otherwise the process proceeds to step S140.

As will become apparent by description about FIG. 15, if the correctness/incorrectness flag indicates the "suspend", the player character 21 does not reach the task, and therefore it indicates that the process suspends the correctness/incorrectness determination. If the correctness/incorrectness flag indicates the "correct answer", it indicates that the execution result of the task is correct. If the correctness/incorrectness flag indicates the "incorrect answer", it indicates that the execution result of the task is incorrect.

If the player character 21 does not reach the task, in step S140, the processor 11 checks the ON/OFF of the jump flag, and the process proceeds to step S141 if ON, conversely the process proceeds to step S144 if OFF.

In step S141, the processor 11 sets jump animation in order to make the player character 21 jump. More specifically speaking, the jump animation of the player character 21 is composed of a plurality of image frames, and the display location information and storage location information of the data of the respective image frames are set in the internal memory (not shown in the figure) in accordance with the playback times of the respective image frames. The processor 11 determines whether or not the jump animation of the player character 21 is finished in step S142, and if it is finished the process proceeds to step S151 after the jump flag is turned off in step S143, otherwise the process proceeds to step S151 without modifying the jump flag.

In step S144 after "NO" is determined in step S140, the processor 11 accesses the side step flag, and if the side step flag is turned off ("0"), the process proceeds to step S150, otherwise proceeds to step S145. In step S145, the processor 11 sets side step animation in order to side step the player character 21 in accordance with the kind of side stepping as indicated by the side step flag. More specifically speaking, the side step animation of the player character 21 is composed of a plurality of image frames, and the display location information and storage location information of the data of the respective image frames are set in the internal memory (not shown in the figure) in accordance with the value of the side step flag and the playback times of the respective image frames. The processor 11 determines whether or not the side step animation of the player character 21 is finished in step S146, and if it is finished the process proceeds to step S151 after the side step flag is turned off in step S147, otherwise the process proceeds to step S151 without modifying the side step flag.

In step S150 after "NO" is determined in step S144, the animation of the player character 21 is set in accordance with the motion number registered in step S17 of FIG. 7. This is because all the jump flag and the side step flag are turned off so that the motion state of the player character 21 is either the motionless state in the standing up position, the walking state or the running state. In particular, in the case where the motion number "0" is registered, the display location information and storage location information of the image data of the player character 21 representing the motionless state in the standing up position are set in the internal memory (not shown in the figure), and in the case where any of the motion numbers 1 to 6 is registered, the display location information and storage location information of the data of the respective image frames are set in the internal memory (not shown in the figure)

in accordance with the animation time (player character) of the animation control table corresponding to the motion number as registered.

In step S151, the processor 11 controls the background in accordance with the motion number registered in step S17 of FIG. 7. More specifically speaking, the display location information and storage location information of the data of the respective image frames are set in the internal memory (not shown in the figure) in accordance with the animation time (background) of the animation control table corresponding to the motion number as registered.

In step S152 after "YES" is determined in step S139, the processor 11 performs the process for setting the image just after answering, and then returns the main routine.

FIG. 15 is a flow chart showing an example of the process of controlling the setting of the question in step S21 of FIG. 7. Referring to FIG. 15, in step S160, the processor 11 determines whether or not the time is the appearance timing of the task (the task panels 23L, 23C and 23R), and the process proceeds to step S162 if it is the appearance timing, otherwise the process proceeds to step S168. The appearance timing is, for example, the time when the head of the road segment appears in the depth part of the screen.

In step S162, the processor 11 performs the process for determining the task. That is, the processor 11 accesses a task table to select the task to be displayed. The task table is a table storing K (two or a larger integer) sets of tasks, a set consists of a total of three task panels 23 in which two panel are the same as each other and one panel is different from the other two panels. In this case, it is determined in a random manner by generating the random number which task among the K sets of tasks is chosen. And, the processor 11 generates the random number to determine the lane 33 where the different task panel 23 is arranged. The same two task panels 23 are arranged on the remaining two lanes 33 respectively.

In step S164, the processor 11 sets display position information and storage location information of image data showing the three task panels 23 in the internal memory (not shown in the figure) in accordance with the result of the determination in step S162. In step S166, the processor 11 sets the correctness/incorrectness flag to the value indicating the "suspend", and then returns to the main routine.

In step S168 after "NO" is determined in step S160, the processor 11 determines whether or not the task is being displayed, and the process proceeds to step S170 it is being displayed, conversely the process proceeds to step S182 it is not being displayed. In step S170, the processor 11 determines whether or not the player character 21 reaches the task panel 23, and the process proceeds to step S172 if it reaches, conversely the process proceeds to step S180 if it does not reach.

In step S172, the processor 11 determines whether or not the task panel 23 which the player character 21 reaches is different from the other two, and in step S174, the processor 11 proceeds to step S176 if it is different from them because the correct answer, otherwise the processor 11 proceeds to step S178 because the incorrect answer. Then, in step S176, the processor 11 sets the correctness/incorrectness flag to the value indicating the "correct answer". On the other hand, in step S178, the correctness/incorrectness flag is set to the value indicating the "incorrect answer".

In step S180 after "NO" is determined in step S170, the processor 11 controls so that the task moves from the depth position to the front position of the screen. More specifically speaking, each of the three task panels 23 is composed of image frames whose number is the same as the number of the image frames of the background, and the display location information and storage location information of the data of the respective image frames are set in the internal memory (not shown in the figure) in accordance with the animation time (background) of the animation control table corresponding to the motion number as registered in step S17. In this way, since the task panels 23 are arranged on the road 35, the movement of the task panels 23 is synchronized with the background.

After "NO" is determined in step S168 or after step S180, the processor 11 sets the correctness/incorrectness flag to the value indicating the "suspend" in step S182, and then returns to the main routine.

FIG. 16 is a flow chart showing an example of the process of setting the image just after answering in step S152 of FIG. 14. Referring to FIG. 16, in step S200, the processor 11 checks the correctness/incorrectness flag, and the process proceeds to step S202 if it indicates the "incorrect answer", conversely the process proceeds to step S212 if it indicates the "correct answer".

In step S202, the processor 11 sets an animation (blinking "X" mark) of an effect in the case of the incorrect answer. More specifically speaking, the effect animation is composed of a plurality of image frames, and the display location information and storage location information of the data of the respective image frames are set in the internal memory (not shown in the figure) in accordance with the playback times of the respective image frames.

In step S204, the processor 11 sets an animation (such animation as to step at the same position) of the player character 21 in the case of the incorrect answer. More specifically speaking, the animation of the player character 21 in the case of the incorrect answer is composed of a plurality of image frames, and the display location information and storage location information of the data of the respective image frames are set in the internal memory (not shown in the figure) in accordance with the playback times of the respective image frames.

In step S206, the processor 11 performs the process of suspending the background. More specifically speaking, the display location information and storage location information of the image data of the background are fixed.

In step S208, it is determined whether or not a penalty time (a fixed time) elapses, the process proceeds to step S210 so as to set the correctness/incorrectness flag to the "suspend" if it elapses, conversely the process returns to the main routine if it does not elapse. In this way, in the case of the incorrect answer, the player character 21 can not advance irrespective of the input from the mat 2 until the penalty time elapses.

On the other hand, in step S212, the processor 11 sets an animation (blinking "O" mark) of an effect in the case of the correct answer. More specifically speaking, the effect animation is composed of a plurality of image frames, and the display location information and storage location information of the data of the respective image frames are set in the internal memory (not shown in the figure) in accordance with the playback times of the respective image frames. In step S214, the processor 11 determines whether or not the effect finishes, the process proceeds to step S216 so as to set the correctness/incorrectness flag to the "suspend" if it finishes, conversely the process proceeds to step S140 of FIG. 14 if it does not finish. Accordingly, in the case of the correct answer, the player character 21 and the background are controlled in accordance with the input from the mat 2.

[Modification]

The tasks (the task panels 23L, 23C and 23R) capable of training the disturbance-exclusion ability and the input-choice ability are presented in the above case. However, a task to be presented is not limited to thereto. For example, a working memory task may be presented as a task. This enables the player to train his/her working memory. In addition, since the input is performed using the legs, it is possible to train the working memory effectively.

The working memory is a function for operating (processing) necessary information while temporarily holding (memorizing) the necessary information, and a part which serves a cognitive function in a brain.

The working memory task is a task by which the working memory of the brain is consumed, and a task for making the player hold (memorize) necessary information temporarily and operate (process) the necessary information. Accordingly, when the working memory task is being executed by the user, activity of at least a part (e.g., a dorsolateral prefrontal cortex (Brodmann areas 46 and 9)) of a prefrontal cortex of the brain of the user increases. As the result, the measurement result, in which electric activity or metabolic activity of nerves of at least a part (e.g., a dorsolateral prefrontal cortex) of a prefrontal cortex in a brain increases when the electric activity or the metabolic activity of the nerves in the brain is measured during the user executes the working memory task, is obtained.

The electric activity of the nerves in the brain can be measured by means of the Electro-EncephaloGram (EEG), the Magneto-EncephaloGram (MEG), and so on. The metabolic activity of the nerves in the brain can be measured by means of the Positron Emission Tomography (PET), the Near-infrared spectroscopy (NIRS), the functional Magnetic Resonance Imaging (fMRI), the Magnetic Resonance Spectroscopy (MRS), and so on.

The Electro-EncephaloGram (EEG) can be obtained by measuring a scalp potential. The Magneto-EncephaloGram (MEG) can be obtained by measuring magnetic field distribution on a scalp. The functional Magnetic Resonance Imaging (fMRI), Positron Emission Tomography (PET), and the Near-infrared spectroscopy (NIRS) measure cerebral hemodynamics. The Magnetic Resonance Spectroscopy (MRS) measures metabolites inside a brain. When a brain is activated, a blood flow, a blood volume, amount of oxygen in blood, a glucose consumption, and an oxygen consumption inside the brain increase, so that it is possible to confirm an activation site in the brain by measuring them using the above measurement methods. The activation site of the brain may be confirmed only by the measurement result based on the one type of the measurement method, or may be confirmed by the measurement results based on the two or more measurement methods.

The working memory tasks include, for example, a memory task, an identification task, a rehearsal task, a maze task, Stroop task, a Go/No-Go task, a selection task, a span test and so on, combination of two or more thereof, a dual task method, and so on.

The memory task is a task which requires short term memory, for example, is an N-back task. The N-back task is a task which asks whether or not a currently presented stimulus is same as a stimuli presented several (N) trials previously. The identification task is a task which requires to identify a letter, a digit, graphics, a drawing and so on. The rehearsal task is a task which requires to repeat content.

The Stroop task is a task which requires to name or select a color when a word naming the color is displayed in a color different from the color it names (alternatively, when a color surrounding the word naming the color is different from the color it names). The maze task is a task which asks the shortest path through a maze. The Go/No-Go task is a task which requires to respond to a stimulus (GO trial) or to appropriately inhibit a response to a stimulus (No-GO trial).

The selection task is a task which requires to select an information item as indicated among a plurality of information items. The dual task is a task which requires to perform two different types of tasks in parallel.

The span test is a test which evaluates short term memory mainly, and, for example, includes a digit span test, a word span test, a reading span test, a counting span test, a operation span test, a listening span test, a spatial span test, and so forth. The digit span test is a test which requires to memorize a plurality of digits as shown simultaneously or sequentially and asks a question to confirm accuracy of the memory. The word span test is a test which requires to memorize a plurality of words as shown simultaneously or sequentially and asks a question to confirm accuracy of the memory. Needless to say, colors, graphics, drawings, or the like may be use instead of the digit and the word. The reading span test is a test which measures the extent to which there is ability of memorizing words while reading. The counting span test is a test which requires to memorize the number of figures while counting the figures. The operation span test is a test which requires to determine whether or not an answer of a numerical calculation is correct determined, and memorize words as shown adjacent to the numerical calculation therewith. The listening span test is a test which requires to memorize words while listening sentence.

In another aspect, the working memory task is a task which yields the measurement result where electric activity or metabolic activity of nerves of at least a part (e.g., a dorsolateral prefrontal cortex) of a prefrontal cortex in a brain increases when the electric activity or the metabolic activity of the nerves in the brain is measured during the user performs the task while operating the input device.

Figure 17:
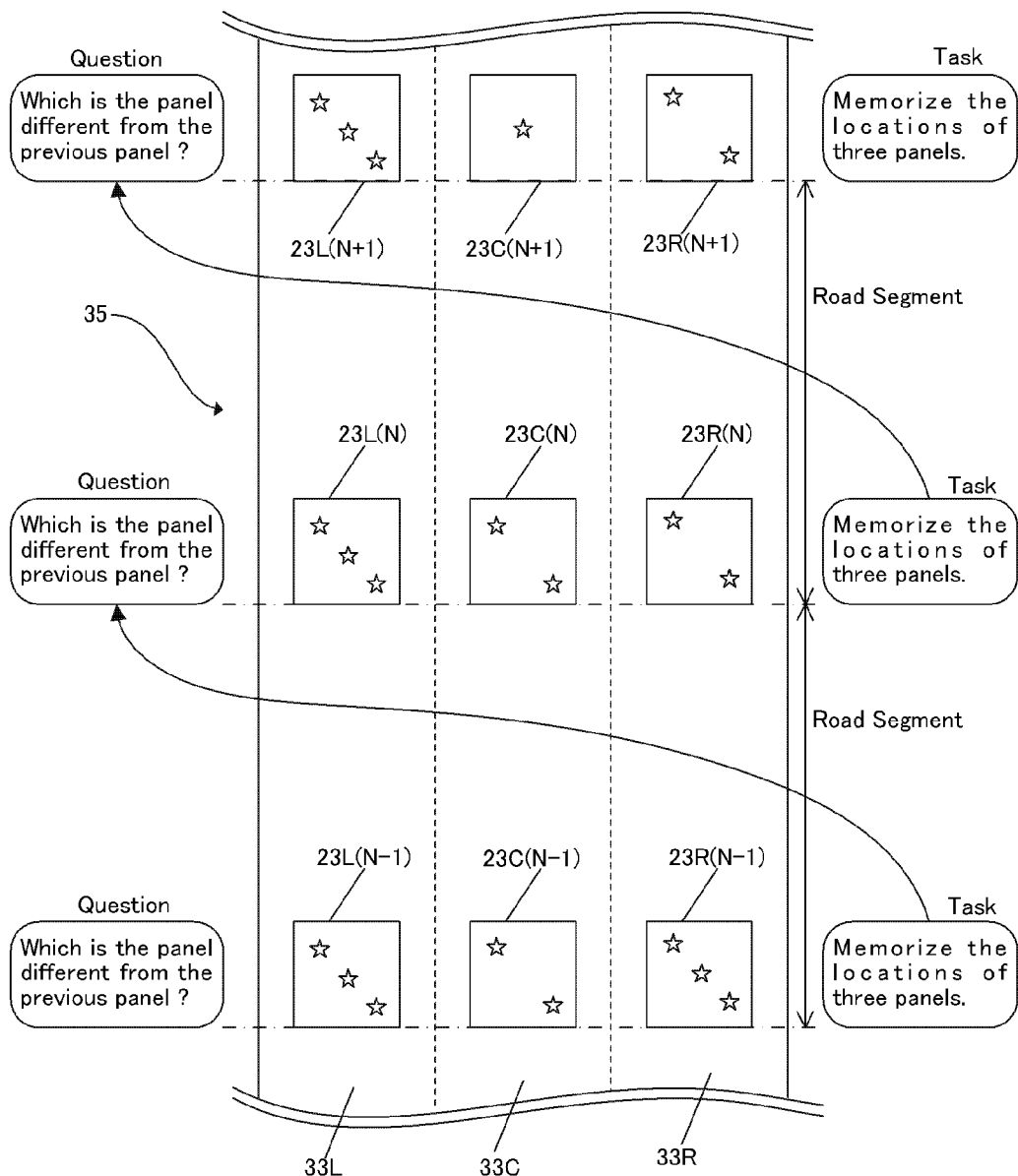
FIG. 17 is an explanatory view of a modification of the present embodiment.

Referring to FIG. 17, the working memory task will be described with examples. In this case, in the figure, the upper side corresponds to the depth side of the screen while the lower side corresponds to the front side of the screen. Also, the suffix "N−1" represents a task which the player character 21 has passed, the suffix "N" represents a task toward which the player character 21 as passed the task represented by the suffix "N−1" is moving, and the suffix "N+1" represents a next task of the task represented by the suffix "N". Incidentally, these suffixes are not shown if the description does not require them.

The task panels 23L, 23C and 23R as arranged on the lanes 33L, 33C and 33R of the screen is both the question at the time ("Which is the panel different from the previous panel?") and the task ("Memorize the locations of three panels."). This point will be described with examples.

It is assumed that the player character 21 reaches the vicinity of the task panels 23 (N). In this case, the player has to select the task panel 23 (N) different from the previous task panel 23 (N−1) from among the task panels 23 (N) toward which he/she is currently moving (in the example of the figure, the different task panel is the task panel 23R (N)). And, the player shifts the player character 21 to the lane 33 where the selected task panel 23 (N) is placed, and moves the player character 21 toward such task panel 23 (N). At the same time, in this case, the player has to memorize the locations of the task panels 23 (N) toward which the player is currently moving so as to compare with the next task panels 23 (N+1).

Figure 18:
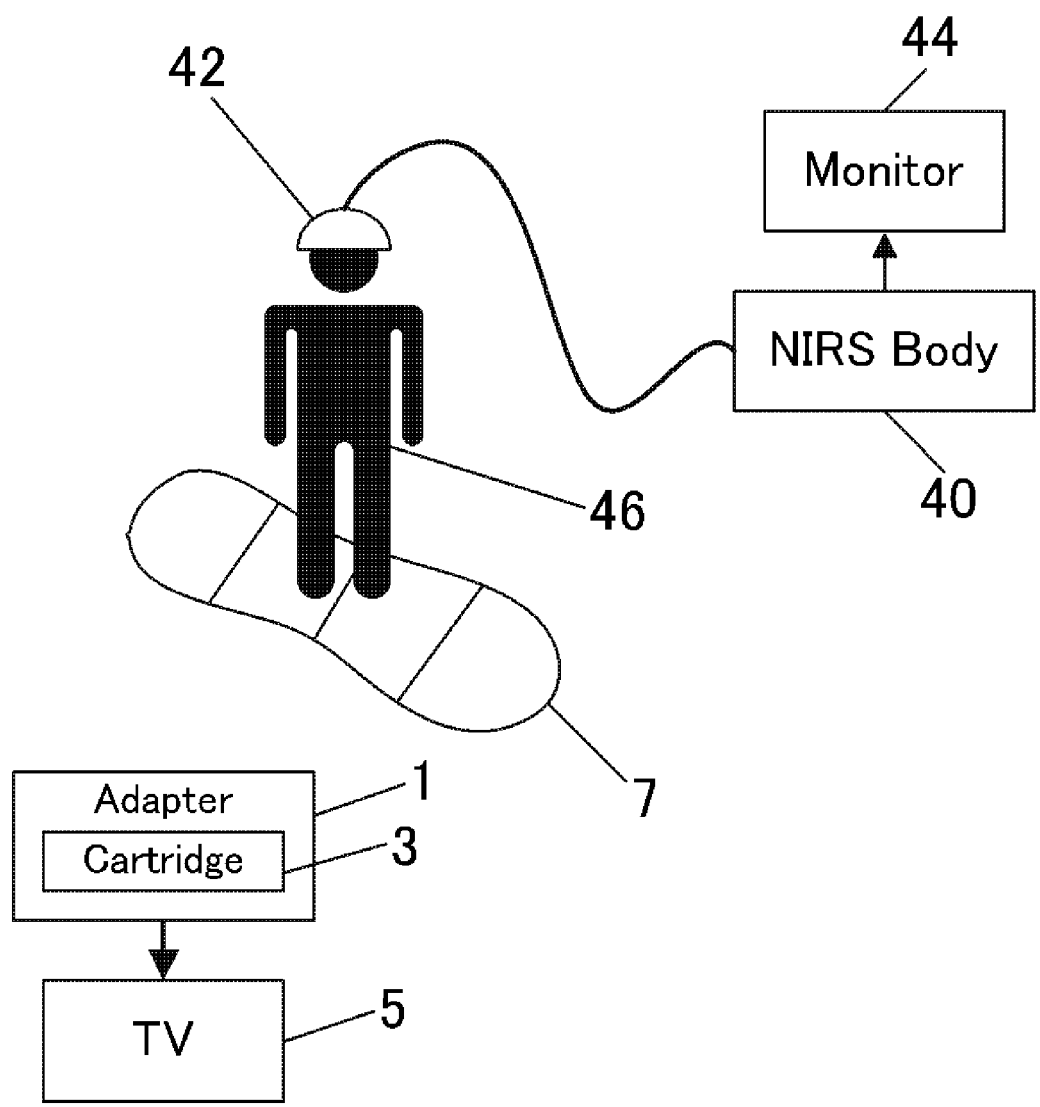
FIG. 18 is a view showing an example of an NIRS system for measuring the activated state of the prefrontal cortex of the user using the brain training system according to the modification.

FIG. 18 is a view showing an example of an NIRS system for measuring the activated state of the prefrontal cortex of the user using the brain training system according to the modification. Referring to FIG. 18, the NIRS system includes a body 40 which incorporates a computer, a monitor 44, and a probe 42 which is mounted on a head of a subject 46. The NIRS system is a device which irradiates the head with near infrared rays by means of the probe 42 so as to observe reflection by hemoglobin, and can measure alteration in blood flow of a local in a brain even when the subject are moving. The body 40 analyzes information from the probe 42, and displays the result on the monitor 44.

The NIRS system can measure the alteration in blood flow of the prefrontal cortex when the subject performs the working memory task. It is anticipated that such measurement obtains the result where activity of at least a part of a prefrontal cortex in a brain increases when the player performs the working memory task. It is anticipated that the extent of the increase of the activity of the brain is larger than the case where the working memory task is performed only by hands using a general game controller.

By the way, as described above, the player performs the tasks by the input operation by the feet. Unlike the hands, since the feet are usually used only as moving means for walking and running, the input operation by the feet is usage of the feet which is not found in daily life. In this way, by performing the tasks with the usage of the feet which is not found in the daily life, it is possible to anticipate the further improvement of the work of the brain in comparison with the case where the hands are used.

Also, since it was reported that the prefrontal cortex of the brain was activated only by walking or running, it is possible to activate the prefrontal cortex of the brain even only by moving in the virtual space by the stepping motion. Accordingly, it is possible to anticipate the still further improvement of the work of the brain, coupled with the execution of the tasks.

Further, since the player can have an experience by performing the stepping motion as if he were actually moving in the virtual space, it is possible to provide the brain training apparatus which he does not get bored easily in comparison with the case where the predetermined tasks are excursively performed.

Still further, since the player repeatedly performs the tasks with the aim of training the brain by the brain training apparatus, it is possible to effectively train the brain of the player in comparison with the case where the tasks are excursively performed.

Also, in accordance with the present embodiment, since the tasks are sequentially displayed in accordance with the forward speed of the player character 21 in the virtual space, as the forward speed is lower, the serial displays of the tasks are slower, while as it is higher, the serial displays of the tasks are faster. And, since the time limit is set (see the remaining time displaying section 29), the forward speed of the player character 21 has to be increased so as to perform many tasks. For this reason, since the player tries to move more quickly, the number of steps per fixed time increases, and thereby it is possible to further contribute to the training of the prefrontal cortex, eventually the training of the working memory. In passing, it is noted that as the number of times of the motions of the legs within the fixed time is higher, the prefrontal cortex of the brain is more activated. Also, it is good for the maintenance and improvement of health.

Further, in accordance with the present embodiment, the disturbance object 25 is displayed. The disturbance object 25 disturbs the player so as to obstruct the execution of the task. The player has to get the correct answer without being affected thereby. It is hereby possible to train the disturbance-exclusion ability of the player.

Still further, in accordance with the present embodiment, the player character 21 executes the motion corresponding to the motion (the motionless state, the walking motion, the running motion, the jumping motion, and the side stepping motion) of the player. Accordingly, the player can have an experience as if he were actually moving in virtual space through the player character 21 by performing the stepping motion. As the result, the player can perform the tasks while having the simulated experience in the virtual space through the player character 21.

Meanwhile, the present invention is not limited to the above embodiment, and a variety of variations may be effected without departing from the spirit and scope thereof, as described in the following modification examples.

(1) The above task is just an example, and the task is not limited thereto.

(2) Although the case where the task and evaluation are represented by the images is mainly described in the above description, these may be represented by voices, or both the images and the voices.

(3) In the above task (see FIG. 3) for training the input-choice ability, one panel is chosen from among three panels. However, the panel to be chosen is not limited to one, and two panels may be chosen. Also, although the road 35 is divided into three lanes 33, the lanes are not limited thereto, and may be two, or not less than four.

(4) Although one disturbance object 25 is displayed in the above description, the disturbance objects may be plural, and/or a display mode may be also set arbitrarily. The processor 11 may generate voice for disturbing.

(5) In the above description, the player character 21 which is synchronized with the motion of the player is displayed. That is, the video image is displayed in the third person viewpoint. However, the video image may be displayed in the so-called first person viewpoint in which the player character 21 is not displayed. That is, the video image which represents the advance in the virtual space may be displayed only by the viewpoint of the player in accordance with the result of the detection by the mat 7 (in response to the motion of the player).

While the present invention has been described in detail in terms of embodiments, it is apparent that those skilled in the art will recognize that the invention is not limited to the embodiments as explained in this application. The present invention can be practiced with modification and alteration within the spirit and scope of the present invention as defined by the appended any one of claims.

The invention claimed is:

1. A foot input type brain training apparatus comprising:
an input unit configured to include a plurality of detecting units each of which detects stepping motion as input from a player;
a video controlling unit operable to display a video image which represents travel in virtual space displayed in a display device based on a result of detection by said input unit;
a task arranging unit operable to arrange a predetermined task in the virtual space; and
an evaluating unit operable to evaluate based on the result of the detection by said input unit and the predetermined task,
wherein the predetermined task is a task which gives information to the player, makes the player memorize the information temporarily, and makes the player process the information, and
wherein the predetermined task is a task by which activity of a part of a prefrontal cortex in a brain increases during the player performs the predetermined task by cooperation with input operation of the player by said input unit.

2. The foot input type brain training apparatus as claimed in claim 1, wherein the predetermined task is a task which instructs to choose one or a predetermined number of ones from among plural ones.

3. The foot input type brain training apparatus as claimed in claim 1, wherein said video controlling unit detects motion of the player based on the result of the detection by said input unit, and displays the video image which represents the travel in the virtual space with speed in accordance with speed of the motion.

4. The foot input type brain training apparatus as claimed in claim 3, wherein said video controlling unit sequentially displays predetermined tasks with speed in accordance with the speed of the travel in the virtual space.

5. The foot input type brain training apparatus as claimed in claim 1 further comprising:
a disturbing unit operable to display an image for disturbing the player on said display device.

6. A foot input type brain training apparatus comprising:
an input unit configured to include a plurality of detecting units each of which detects stepping motion as input from a player;
a video controlling unit operable to display a video image which represents travel in virtual space displayed in a display device based on a result of detection by said input unit;
a task arranging unit operable to arrange a predetermined task in the virtual space; and
an evaluating unit operable to evaluate based on the result of the detection by said input unit and the predetermined task,
wherein the predetermined task is a task which gives information to the player, makes the player memorize the information temporarily, and makes the player process the information, and
wherein the predetermined task is a task which yields a measurement result where electric activity or metabolic activity of nerves of a part of a prefrontal cortex in a brain increases when the electric activity or the metabolic activity of the nerves in the brain is measured during the player performs the predetermined task by input operation using said input unit.

7. The foot input type brain training apparatus as claimed in claim 6, wherein the predetermined task is a task which instructs to choose one or a predetermined number of ones from among plural ones.

8. The foot input type brain training apparatus as claimed in claim 6, wherein said video controlling unit detects motion of the player based on the result of the detection by said input unit, and displays the video image which represents the travel in the virtual space with speed in accordance with speed of the motion.

9. The foot input type brain training apparatus as claimed in claim 8, wherein said video controlling unit sequentially displays predetermined tasks with speed in accordance with the speed of the travel in the virtual space.

10. The foot input type brain training apparatus as claimed in claim 6 further comprising:
a disturbing unit operable to display an image for disturbing the player on said display device.

11. A foot input type brain training apparatus comprising:
an input unit configured to include a plurality of detecting units each of which detects stepping motion as input from a player;
a video controlling unit operable to display a video image which represents travel in virtual space displayed in a display device based on a result of detection by said input unit;
a task arranging unit operable to arrange a predetermined task in the virtual space;
an evaluating unit operable to evaluate based on the result of the detection by said input unit and the predetermined task; and
a course generating unit operable to generate a course for traveling in the virtual space,
wherein said task arranging unit arranges a plurality of task objects which represent the predetermined task as a group on the course,
the foot input type brain training apparatus further comprising:
a motion determining unit operable to determine which one of a plurality of predetermined motion patterns motion of the player corresponds to based on a result of detection by the detecting unit,
wherein the plurality of the predetermined motion patterns are a part or all of a motionless state, a walking motion, a running motion, a side stepping motion, and a jumping motion,
wherein the course is divided into a plurality of areas along a traveling direction,
wherein said task arranging unit aligns the plurality of the task objects by displaying the task object on each of the areas,
wherein said video controlling unit displays the video image representing the travel on the single area if the motion pattern determined by said motion determining unit corresponds to any one of the motionless state, the walking motion, the running motion, and the jumping motion, and
wherein said video controlling unit displays the video image representing a shift from the one area to the other area if the motion pattern determined by said motion determining unit corresponds to the side stepping motion.

12. A non-transitory computer readable medium having stored thereon a computer program configured to cause a computer to function as a foot input type brain training apparatus, by executing the steps of:
displaying a video image which represents travel in virtual space displayed in a display device based on a result of detection by an input unit including a plurality of detecting units each of which detects stepping motion as input from a player;
arranging a predetermined task in the virtual space; and
evaluating based on the result of the detection by said input unit and the predetermined task,
wherein the predetermined task is a task which gives information to the player, makes the player memorize the information temporarily, and makes the player process the information, and
wherein the predetermined task is a task by which activity of a part of a prefrontal cortex in a brain increases during the player performs the predetermined task by cooperation with input operation of the player by said input unit.

13. The non-transitory computer readable medium as claimed in claim 12, wherein the predetermined task is a task which instructs to choose one or a predetermined number of ones from among plural ones.

14. The non-transitory computer readable medium as claimed in claim 12, wherein said step of displaying the video image comprising:
- detecting motion of the player based on the result of the detection by said input unit; and
- displaying the video image which represents the travel in the virtual space with speed in accordance with speed of the motion.

15. The non-transitory computer readable medium as claimed in claim 14, wherein said step of displaying the video image further comprising:
- displaying predetermined tasks sequentially with speed in accordance with the speed of the travel in the virtual space.

16. A non-transitory computer readable medium having stored thereon a computer program configured to cause a computer to function as a foot input type brain training apparatus, by executing the steps of:
- displaying a video image which represents travel in virtual space displayed in a display device based on a result of detection by an input unit including a plurality of detecting units each of which detects stepping motion as input from a player;
- arranging a predetermined task in the virtual space; and
- evaluating based on the result of the detection by said input unit and the predetermined task,
- wherein the predetermined task is a task which gives information to the player, makes the player memorize the information temporarily, and makes the player process the information, and
- wherein the predetermined task is a task which yields a measurement result where electric activity or metabolic activity of nerves of a part of a prefrontal cortex in a brain increases when the electric activity or the metabolic activity of the nerves in the brain is measured during the player performs the predetermined task by input operation using said input unit.

17. The non-transitory computer readable medium as claimed in claim 16, wherein the predetermined task is a task which instructs to choose one or a predetermined number of ones from among plural ones.

18. The non-transitory computer readable medium as claimed in claim 16, wherein said step of displaying the video image comprising:
- detecting motion of the player based on the result of the detection by said input unit; and
- displaying the video image which represents the travel in the virtual space with speed in accordance with speed of the motion.

19. The non-transitory computer readable medium as claimed in claim 18, wherein said step of displaying the video image further comprising:
- displaying predetermined tasks sequentially with speed in accordance with the speed of the travel in the virtual space.

20. A non-transitory computer readable medium having stored thereon a computer program configured to cause a computer to function as a foot input type brain training apparatus, by executing a process comprising the steps of:
- displaying a video image which represents travel in virtual space displayed in a display device based on a result of detection by an input unit including a plurality of detecting units each of which detects stepping motion as input from a player;
- arranging a predetermined task in the virtual space;
- evaluating based on the result of the detection by said input unit and the predetermined task; and
- generating a course for traveling in the virtual space,
- said step of arranging the predetermined task comprising:
- arranging a plurality of task objects which represent the predetermined task as a group on the course,
- the process further comprising the step of:
- determining which one of a plurality of predetermined motion patterns motion of the player corresponds to based on a result of detection by the detecting unit,
- wherein the plurality of the predetermined motion patterns are a part or all of a motionless state, a walking motion, a running motion, a side stepping motion, and a jumping motion,
- wherein the course is divided into a plurality of areas along a traveling direction,
- the step of arranging the plurality of the task objects comprising:
- aligning the plurality of the task objects by displaying the task object on each of the areas,
- the step of displaying the video image comprising:
- displaying the video image representing the travel on the single area if the motion pattern determined by the step of determining corresponds to any one of the motionless state, the walking motion, the running motion, and the jumping motion, and displaying the video image representing a shift from the one area to the other area if the motion pattern determined by the step of determining corresponds to the side stepping motion.

* * * * *